United States Patent
Takahashi et al.

(10) Patent No.: US 11,550,088 B2
(45) Date of Patent: Jan. 10, 2023

(54) PHASE DIFFERENCE FILM, CIRCULARLY POLARIZING PLATE, AND DISPLAY DEVICE

(71) Applicant: FUJIFILM Corporation, Tokyo (JP)

(72) Inventors: Yuta Takahashi, Kanagawa (JP);
Yusuke Furuki, Kanagawa (JP);
Toshihiro Konishi, Kanagawa (JP);
Hiroki Kuwahara, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/824,536

(22) Filed: May 25, 2022

(65) Prior Publication Data

US 2022/0397712 A1    Dec. 15, 2022

(30) Foreign Application Priority Data

Jun. 1, 2021 (JP) .............................. JP2021-092459
Aug. 31, 2021 (JP) .............................. JP2021-141585
Sep. 30, 2021 (JP) .............................. JP2021-162142
Dec. 7, 2021 (JP) .............................. JP2021-198682

(51) Int. Cl.
*G02B 5/30* (2006.01)
*G02F 1/13363* (2006.01)

(52) U.S. Cl.
CPC ....... *G02B 5/3016* (2013.01); *G02F 1/13363* (2013.01); *G02F 1/133636* (2013.01); *G02F 2413/04* (2013.01); *G02F 2413/15* (2013.01)

(58) Field of Classification Search
CPC ........... G02F 1/13363; G02F 1/133636; G02F 2413/05; G02F 2313/07; G02F 2413/15
See application file for complete search history.

(56) References Cited

U.S. PATENT DOCUMENTS

| | | | |
|---|---|---|---|
| 9,128,322 B2 | 9/2015 | Saitoh et al. | |
| 10,914,881 B2* | 2/2021 | Iida | G02B 5/3033 |
| 2006/0203162 A1* | 9/2006 | Ito | G02F 1/1393 |
| | | | 349/117 |
| 2007/0279553 A1* | 12/2007 | Yoda | G02F 1/13363 |
| | | | 349/96 |

(Continued)

FOREIGN PATENT DOCUMENTS

JP    5960743 B2    8/2016

*Primary Examiner* — Jessica M Merlin
(74) *Attorney, Agent, or Firm* — Edwards Neils LLC; Jean C. Edwards, Esq.

(57) ABSTRACT

Provided are a phase difference film that has a small change in tint in a case where the phase difference film is combined with a polarizer and then applied as a circularly polarizing plate to a display device, and the display device is observed from an oblique direction at all azimuthal angles; as well as a circularly polarizing plate and a display device. The phase difference film includes a first optically anisotropic layer, a second optically anisotropic layer, a third optically anisotropic layer, and a fourth optically anisotropic layer in this order, in which the first optically anisotropic layer is a C-plate, the second optically anisotropic layer is an A-plate, the third optically anisotropic layer is a layer formed by fixing a liquid crystal compound twist-aligned along a helical axis extending in a thickness direction, and the first, second, third, and fourth optically anisotropic layers have a predetermined configuration.

17 Claims, 5 Drawing Sheets

(56) References Cited

U.S. PATENT DOCUMENTS

| | | | |
|---|---|---|---|
| 2010/0026936 A1* | 2/2010 | Uesaka | G02F 1/13363 349/194 |
| 2010/0045910 A1* | 2/2010 | Bitou | G02B 5/3083 359/489.07 |
| 2014/0284583 A1 | 9/2014 | Saitoh et al. | |

* cited by examiner

PHASE DIFFERENCE FILM, CIRCULARLY POLARIZING PLATE, AND DISPLAY DEVICE

CROSS-REFERENCE TO RELATED APPLICATIONS

The present application claims priority under 35 U.S.C. § 119 to Japanese Patent Application No. 2021-092459 filed on Jun. 1, 2021, Japanese Patent Application No. 2021-141585 filed on Aug. 31, 2021, Japanese Patent Application No. 2021-162142 filed on Sep. 30, 2021 and Japanese Patent Application No. 2021-198682 filed on Dec. 7, 2021. The above applications are hereby expressly incorporated by reference, in their entirety, into the present application.

BACKGROUND OF THE INVENTION

1. Field of the Invention

The present invention relates to a phase difference film, a circularly polarizing plate, and a display device.

2. Description of the Related Art

A phase difference film having refractive index anisotropy is applied to various applications such as an antireflection film of a display device and an optical compensation film of a liquid crystal display device.

For example, JP5960743B discloses a phase difference plate in which two types of optically anisotropic layers exhibiting predetermined optical characteristics are laminated.

SUMMARY OF THE INVENTION

The present inventors have found that, in a case where an optical film described in JP5960743B on which an optically anisotropic layer is laminated is combined with a polarizer and then applied as a circularly polarizing plate to a display device, and the display device is observed from an oblique direction at all azimuthal angles, there is a large change in tint and therefore there is room for improvement.

The present invention has been made in view of the above-mentioned circumstances, and an object of the present invention is to provide a phase difference film that has a small change in tint in a case where the phase difference film is combined with a polarizer and then applied as a circularly polarizing plate to a display device, and the display device is observed from an oblique direction at all azimuthal angles.

Another object of the present invention is to provide a circularly polarizing plate and a display device.

As a result of extensive studies on the problems of the related art, the present inventors have found that the foregoing objects can be achieved by the following configurations.

(1) A phase difference film including a first optically anisotropic layer, a second optically anisotropic layer, a third optically anisotropic layer, and a fourth optically anisotropic layer in this order, in which the first optically anisotropic layer is a C-plate, the second optically anisotropic layer is an A-plate, the third optically anisotropic layer is a layer formed by fixing a liquid crystal compound twist-aligned along a helical axis extending in a thickness direction, the fourth optically anisotropic layer is a C-plate, in a case where the first optically anisotropic layer is a negative C-plate, the second optically anisotropic layer is a negative A-plate, the liquid crystal compound of the third optically anisotropic layer is a rod-like liquid crystal compound, and the fourth optically anisotropic layer is a positive C-plate, in a case where the first optically anisotropic layer is a positive C-plate, the second optically anisotropic layer is a positive A-plate, the liquid crystal compound of the third optically anisotropic layer is a disk-like liquid crystal compound, and the fourth optically anisotropic layer is a negative C-plate, and an angle formed by an in-plane slow axis of the second optically anisotropic layer and an in-plane slow axis of the third optically anisotropic layer on a surface on the second optically anisotropic layer side is in a range of 0° to 30°.

(2) The phase difference film according to (1), in which a twisted angle of the liquid crystal compound is within a range of 80°±30°.

(3) The phase difference film according to (1) or (2), in which an absolute value of a thickness direction retardation of the first optically anisotropic layer at a wavelength of 550 nm is 5 to 100 nm.

(4) The phase difference film according to any one of (1) to (3), in which an in-plane retardation of the second optically anisotropic layer at a wavelength of 550 nm is 120 to 240 nm.

(5) The phase difference film according to any one of (1) to (4), in which a value of a product $\Delta nd$ of a refractive index anisotropy $\Delta n$ of the third optically anisotropic layer at a wavelength of 550 nm and a thickness d of the third optically anisotropic layer is 120 to 240 nm.

(6) The phase difference film according to any one of (1) to (5), in which an absolute value of a thickness direction retardation of the fourth optically anisotropic layer at a wavelength of 550 nm is 5 to 100 nm.

(7) A phase difference film including a first optically anisotropic layer, a second optically anisotropic layer, a third optically anisotropic layer, and a fourth optically anisotropic layer in this order, in which the first optically anisotropic layer and the second optically anisotropic layer are in direct contact with each other or are laminated through an adhesion layer, the second optically anisotropic layer and the third optically anisotropic layer are in direct contact with each other or are laminated through an adhesion layer, the third optically anisotropic layer and the fourth optically anisotropic layer are in direct contact with each other or are laminated through an adhesion layer, and the phase difference film satisfies at least one of Requirements 1 to 4 which will be described later.

(8) A phase difference film including a first optically anisotropic layer, a second optically anisotropic layer, a third optically anisotropic layer, and a fourth optically anisotropic layer in this order, in which the first optically anisotropic layer is a C-plate, the second optically anisotropic layer is an A-plate, the third optically anisotropic layer is a layer formed by fixing a liquid crystal compound twist-aligned along a helical axis extending in a thickness direction, the fourth optically anisotropic layer is a C-plate, at least one pair of the first optically anisotropic layer and the second optically anisotropic layer, the second optically anisotropic layer and the third optically anisotropic layer, or the third optically anisotropic layer and the fourth optically anisotropic layer are laminated through an adhesion layer, and a difference between an average refractive index of the adhesion layer and an average refractive index of the optically anisotropic layer adjacent to the adhesion layer is 0.10 or less.

(9) The phase difference film according to (7) or (8), in which the second optically anisotropic layer and the third optically anisotropic layer are laminated through the adhesion layer, a difference between the average refractive index of the adhesion layer and an average refractive index of the second optically anisotropic layer is 0.08 or less, and a difference between the average refractive index of the adhesion layer and an average refractive index of the third optically anisotropic layer is 0.08 or less.

(10) The phase difference film according to (8), in which the phase difference film satisfies all of Requirements 1 to 4 which will be described later.

(11) A circularly polarizing plate including a polarizer and the phase difference film according to any one of (1) to (10).

(12) A display device including the phase difference film according to any one of (1) to (10) or the circularly polarizing plate according to (11).

According to an aspect of the present invention, it is possible to provide a phase difference film that has a small change in tint in a case where the phase difference film is combined with a polarizer and then applied as a circularly polarizing plate to a display device, and the display device is observed from an oblique direction at all azimuthal angles.

According to another aspect of the present invention, it is possible to provide a circularly polarizing plate and a display device.

DESCRIPTION OF THE PREFERRED EMBODIMENTS

Figure 1:
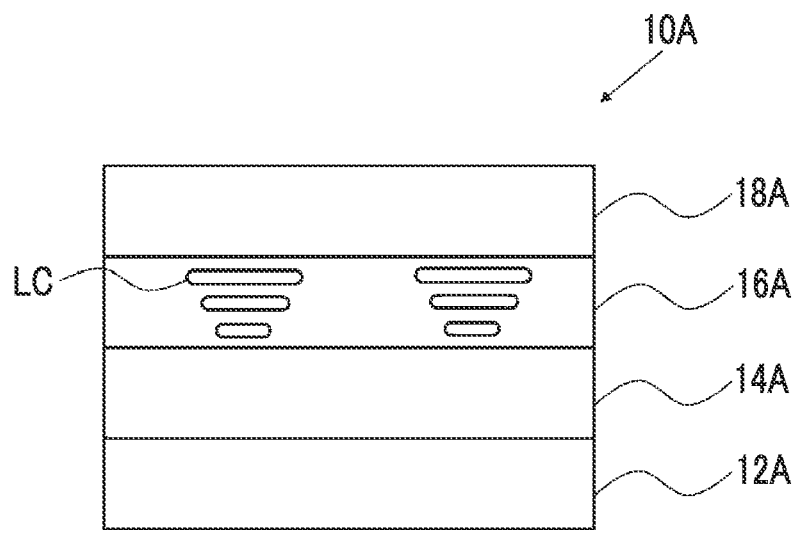
FIG. 1 is an example of a schematic cross-sectional view of a first embodiment of a phase difference film of the present invention.

Hereinafter, the present invention will be described in more detail.

Any numerical range expressed using "to" in the present specification refers to a range including the numerical values before and after the "to" as a lower limit value and an upper limit value, respectively.

In addition, the in-plane slow axis and the in-plane fast axis are defined at a wavelength of 550 nm unless otherwise specified. That is, unless otherwise specified, for example, the in-plane slow axis direction means a direction of the in-plane slow axis at a wavelength of 550 nm.

In the present invention, $Re(\lambda)$ and $Rth(\lambda)$ represent an in-plane retardation and a thickness direction retardation at a wavelength $\lambda$, respectively. Unless otherwise specified, the wavelength $\lambda$ is 550 nm.

In the present invention, $Re(\lambda)$ and $Rth(\lambda)$ are values measured at a wavelength $\lambda$ in AxoScan OPMF-1 (manufactured by Opto Science, Inc.). By inputting a refractive index $((nx+ny+nz)/3)$ and a film thickness (d ($\mu$m)) in AxoScan, slow axis direction (°)

$$Re(\lambda)=R0(\lambda)$$

$$Rth(\lambda)=((nx+ny)/2-nz)\times d$$

are calculated.

Although $R0(\lambda)$ is displayed as a numerical value calculated by AxoScan OPMF-1, it means $Re(\lambda)$.

In the present specification, the refractive index $((nx+ny+nz)/3)$ is measured using an Abbe refractometer (NAR-4T, manufactured by Atago Co., Ltd.) and using a sodium lamp ($\lambda$=589 nm) as a light source. In addition, in a case of measuring the wavelength dependence, it can be measured with a multi-wavelength Abbe refractometer DR-M2 (manufactured by Atago Co., Ltd.) in combination with an interference filter. In a case of a liquid crystal compound, the average refractive index can be measured by measuring a film immobilized into an optically isotropic phase by this method.

In addition, the values in Polymer Handbook (John Wiley & Sons, Inc.) and catalogs of various optical films can be used. The values of the average refractive index of main optical films are illustrated below: cellulose acylate (1.48), cycloolefin polymer (1.52), polycarbonate (1.59), polymethylmethacrylate (1.49), and polystyrene (1.59).

In the present specification, the A-plate and the C-plate are defined as follows.

There are two types of A-plates, a positive A-plate (A-plate which is positive) and a negative A-plate (A-plate which is negative). The positive A-plate satisfies the relationship of Expression (A1) and the negative A-plate satisfies the relationship of Expression (A2) in a case where a refractive index in a film in-plane slow axis direction (in a direction in which an in-plane refractive index is maximum) is defined as nx, a refractive index in an in-plane direction orthogonal to the in-plane slow axis is defined as ny, and a refractive index in a thickness direction is defined as nz. In addition, the positive A-plate has an Rth showing a positive value and the negative A-plate has an Rth showing a negative value.

$$nx > ny \approx nz \quad \text{Expression (A1)}$$

$$ny < nx \approx nz \quad \text{Expression (A2)}$$

It should be noted that the symbol "≈" encompasses not only a case where the both sides are completely the same as each other but also a case where the both sides are substantially the same as each other. The expression "substantially the same" means that, for example, a case where (ny−nz)×d (in which d is a thickness of a film) is −10 to 10 nm and preferably −5 to 5 nm is also included in "ny≈nz"; and a case where (nx−nz)×d is −10 to 10 nm and preferably −5 to 5 nm is also included in "nx≈nz".

There are two types of C-plates, a positive C-plate (C-plate which is positive) and a negative C-plate (C-plate which is negative). The positive C-plate satisfies the relationship of Expression (C1) and the negative C-plate satisfies the relationship of Expression (C2). In addition, the positive C-plate has an Rth showing a negative value and the negative C-plate has an Rth showing a positive value.

$$nz > nx \approx ny \quad \text{Expression (C1)}$$

$$nz < nx \approx ny \quad \text{Expression (C2)}$$

It should be noted that the symbol "≈" encompasses not only a case where the both sides are completely the same as each other but also a case where the both sides are substantially the same as each other. The expression "substantially the same" means that, for example, a case where (nx−ny)×d (in which d is a thickness of a film) is 0 to 10 nm and preferably 0 to 5 nm is also included in "nx≈ny".

In the present specification, the average refractive index of an optically anisotropic layer such as an A-plate, a C-plate, and a layer formed by fixing a liquid crystal compound twist-aligned along a helical axis extending in a thickness direction is defined as in Expression (N1). In Expression (N1), nx means a refractive index in a layer in-plane slow axis direction (a direction in which the refractive index in the plane is maximized) in the same manner as above, and ny means the refractive index in a direction orthogonal to an in-plane slow axis in the plane also in the same manner as above.

$$(\text{average refractive index}) = (nx + ny)/2 \quad \text{Expression (N1)}$$

In addition, the average refractive index of the adhesion layer is also calculated by Expression (N1). In a case where the adhesion layer is optically isotropic, the refractive index in any direction in the plane of the adhesion layer is defined as the average refractive index.

The average refractive index means an average refractive index at a wavelength of 550 nm.

The average refractive index can be measured using a reflection spectroscopic film thickness meter FE 3000 (manufactured by Otsuka Electronics Co., Ltd.) as shown in Examples which will be described later. Specifically, the average refractive index can be calculated by measuring a reflectance spectrum of a layer whose refractive index is to be measured using the reflection spectroscopic film thickness meter FE 3000, and applying the n-Cauchy dispersion equation to the obtained reflectance spectrum.

In addition, in the present specification, in a case of "A layer and B layer are laminated through an adhesion layer", the A layer and the B layer are laminated in a state where the adhesion layer is in contact with the A layer and the B layer. That is, one surface of the adhesion layer is in contact with the A layer, the other surface of the adhesion layer is in contact with the B layer, so the adhesion layer is arranged between the A layer and the B layer.

In the present specification, the "visible ray" is intended to refer to light having a wavelength of 400 to 700 nm. In addition, the "ultraviolet ray" is intended to refer to light having a wavelength of 10 nm or more and less than 400 nm.

In addition, in the present specification, the "orthogonal" or "parallel" is intended to include a range of errors acceptable in the art to which the present invention pertains. For example, it means that an angle is within an error range of ±5° with respect to the exact angle, and the error with respect to the exact angle is preferably within a range of ±3°.

A feature point of the phase difference film according to the embodiment of the present invention is that predetermined optically anisotropic layers are used in combination.

First Embodiment of Phase Difference Film

Hereinafter, the first embodiment of the phase difference film according to the embodiment of the present invention will be described with reference to the accompanying drawings. FIG. 1 shows a schematic cross-sectional view of the first embodiment of the phase difference film according to the embodiment of the present invention.

A phase difference film 10A has a first optically anisotropic layer 12A, a second optically anisotropic layer 14A, a third optically anisotropic layer 16A, and a fourth optically anisotropic layer 18A in this order.

The first optically anisotropic layer 12A is a negative C-plate, the second optically anisotropic layer 14A is a negative A-plate, the third optically anisotropic layer 16A is a layer formed by fixing a rod-like liquid crystal compound LC twist-aligned along a helical axis extending in a thickness direction, and the fourth optically anisotropic layer 18A is a positive C-plate.

The in-plane slow axis of the second optically anisotropic layer 14A is parallel to the in-plane slow axis on the surface of the third optically anisotropic layer 16A on the second optically anisotropic layer 14A side.

Hereinafter, each layer will be described in detail.

First Optically Anisotropic Layer 12A

The first optically anisotropic layer 12A is a negative C-plate.

The thickness direction retardation of the first optically anisotropic layer 12A at a wavelength of 550 nm is not particularly limited, and is preferably 5 to 100 nm and more preferably 10 to 90 nm from the viewpoint that there is a smaller change in tint (hereinafter, also simply referred to as "the effect of the present invention is more excellent") in a case where the phase difference film according to the embodiment of the present invention is combined with a polarizer and then applied as a circularly polarizing plate to a display device, and the display device is observed from an oblique direction at all azimuthal angles.

The configuration of the first optically anisotropic layer 12A is not particularly limited as long as it is a negative C-plate, and examples thereof include a layer formed by fixing a disk-like liquid crystal compound horizontally aligned and a resin film.

The state in which a disk-like liquid crystal compound is horizontally aligned means that the disc plane of the disk-like liquid crystal compound and the main surface of the layer are parallel to each other. It is not required to be strictly parallel, and the angle formed by the disc plane and the main surface of the layer is preferably in a range of 0°±20° and more preferably in a range of 0°±10°.

In the present specification, the "fixed" state is a state in which the alignment of the liquid crystal compound is maintained. Specifically, the "fixed" state is preferably a state in which, in a temperature range of usually 0° C. to 50° C. or in a temperature range of −30° C. to 70° C. under more severe conditions, the layer has no fluidity and a fixed alignment morphology can be maintained stably without causing a change in the alignment morphology due to an external field or an external force.

A known compound can be used as the disk-like liquid crystal compound.

Examples of the disk-like liquid crystal compound include the compounds described in paragraphs [0020] to [0067] of JP2007-108732A and paragraphs [0013] to [0108] of JP2010-244038A.

The disk-like liquid crystal compound may have a polymerizable group.

In the present specification, the type of the polymerizable group is not particularly limited, and is preferably a functional group capable of an addition polymerization reaction, more preferably a polymerizable ethylenic unsaturated group or a ring-polymerizable group, and still more preferably a (meth)acryloyl group, a vinyl group, a styryl group, or an allyl group.

The type of the resin constituting the resin film is not particularly limited, and examples thereof include triacetyl cellulose (TAC).

The first optically anisotropic layer 12A is preferably a layer formed by fixing a disk-like liquid crystal compound having a polymerizable group horizontally aligned by polymerization.

The thickness of the first optically anisotropic layer 12A is not particularly limited. In a case where the first optically anisotropic layer 12A is a layer formed by fixing a disk-like liquid crystal compound horizontally aligned, the thickness of the first optically anisotropic layer 12A is preferably 10 μm or less, more preferably 0.1 to 5.0 μm, and still more preferably 0.3 to 2.0 μm.

In a case where the first optically anisotropic layer 12A is a resin film, the thickness of the first optically anisotropic layer 12A is preferably 10 to 100 μm and more preferably 15 to 90 μm.

The thickness of the first optically anisotropic layer 12A is intended to refer to an average thickness of the first optically anisotropic layer 12A. The average thickness is obtained by measuring the thicknesses of any five or more points of the first optically anisotropic layer 12A and arithmetically averaging the measured values.

Second Optically Anisotropic Layer 14A

The second optically anisotropic layer 14A is a negative A-plate.

The in-plane retardation of the second optically anisotropic layer 14A at a wavelength of 550 nm is not particularly limited, and is preferably 120 to 240 nm and more preferably 130 to 230 nm from the viewpoint that the effect of the present invention is more excellent.

The thickness direction retardation of the second optically anisotropic layer 14A at a wavelength of 550 nm is not particularly limited, and is preferably −120 to −60 nm and more preferably −115 to −65 nm from the viewpoint that the effect of the present invention is more excellent.

The second optically anisotropic layer 14A may exhibit forward wavelength dispersibility (characteristic that the in-plane retardation decreases as the measurement wavelength increases) or reverse wavelength dispersibility (characteristic that the in-plane retardation increases as the measurement wavelength increases). The forward wavelength dispersibility and the reverse wavelength dispersibility are preferably exhibited in the visible light region.

The configuration of the second optically anisotropic layer 14A is not particularly limited as long as it is a negative A-plate, and examples thereof include a layer formed by fixing a disk-like liquid crystal compound that is vertically aligned and whose optical axis (axis orthogonal to the disc plane) is arranged in the same direction and a stretching film, among which a layer formed by fixing a disk-like liquid crystal compound that is vertically aligned and whose optical axis (axis orthogonal to the disc plane) is arranged in the same direction is preferable from the viewpoint that the effect of the present invention is more excellent.

The state in which a disk-like liquid crystal compound is vertically aligned means that the disc plane of the disk-like liquid crystal compound and the thickness direction of the layer are parallel to each other. It is not required to be strictly parallel, and the angle formed by the disc plane and the thickness direction of the layer is preferably in a range of 0°±20° and more preferably in a range of 0°±10°.

In addition, the state in which the optical axis (axis orthogonal to the disc plane) of the disk-like liquid crystal compound is arranged in the same direction does not require that the optical axis of the disk-like liquid crystal compound is arranged strictly in the same direction, but is intended to mean that, in a case where the direction of the slow axis is measured at any 20 positions in the plane, the maximum difference between the slow axis directions among the slow axis directions at 20 positions (the difference between the two slow axis directions having a maximum difference among the 20 slow axis directions) is less than 10°.

Examples of the disk-like liquid crystal compound include the disk-like liquid crystal compound exemplified in the first optically anisotropic layer 12A.

The disk-like liquid crystal compound may have a polymerizable group.

The types of polymerizable groups that the disk-like liquid crystal compound may have are as described above.

The second optically anisotropic layer 14A is preferably a layer formed by fixing a disk-like liquid crystal compound having a polymerizable group by polymerization.

The thickness of the second optically anisotropic layer 14A is not particularly limited, and is preferably 10 μm or less, more preferably 0.1 to 5.0 μm, and still more preferably 0.3 to 2.0 μm.

The thickness of the second optically anisotropic layer 14A is intended to refer to an average thickness of the second optically anisotropic layer 14A. The average thickness is obtained by measuring the thicknesses of any five or more points of the second optically anisotropic layer 14A and arithmetically averaging the measured values.

Third Optically Anisotropic Layer 16A

The third optically anisotropic layer 16A is a layer formed by fixing a rod-like liquid crystal compound LC twist-aligned along a helical axis extending in a thickness direction.

The third optically anisotropic layer 16A is preferably a layer formed by fixing a so-called chiral nematic phase having a helical structure. In a case of forming the third optically anisotropic layer 16A, it is preferable to use at least a rod-like liquid crystal compound and a chiral agent which will be described later.

The twisted angle of the rod-like liquid crystal compound (twisted angle of the liquid crystal compound in an alignment direction) is not particularly limited, and is often more than 0° and 360° or less. From the viewpoint that the effect of the present invention is more excellent, the twisted angle of the rod-like liquid crystal compound is preferably within a range of 80°±30° (within a range of 50° to 110°) and more preferably within a range of 80°±20° (within a range of 60° to 100°).

The twisted angle is measured using an AxoScan (polarimeter) device manufactured by Axometrics, Inc. and using device analysis software of Axometrics, Inc.

In addition, the phrase "the rod-like liquid crystal compound is twist-aligned" is intended to mean that the rod-like liquid crystal compound from one main surface to the other main surface of the third optically anisotropic layer 16A is twisted about the thickness direction of the third optically anisotropic layer 16A. Along with this, the alignment direction (in-plane slow axis direction) of the rod-like liquid crystal compound differs depending on the position of the third optically anisotropic layer 16A in a thickness direction.

In the twisted alignment, the major axis of the rod-like liquid crystal compound is arranged so as to be parallel to the main surface of the third optically anisotropic layer 16A. It is not required to be strictly parallel, and the angle formed by the major axis of the rod-like liquid crystal compound and the main surface of the third optically anisotropic layer 16A is preferably in a range of 0°±20° and more preferably in a range of 0°±10°.

The value of the product $\Delta nd$ of the refractive index anisotropy $\Delta n$ of the third optically anisotropic layer 16A at a wavelength of 550 nm and the thickness d of the third optically anisotropic layer 16A is not particularly limited, and is preferably 120 to 240 nm and more preferably 130 to 230 nm from the viewpoint that the effect of the present invention is more excellent.

The $\Delta nd$ is measured using an AxoScan (polarimeter) device manufactured by Axometrics, Inc. and using device analysis software of Axometrics, Inc.

The angle formed by the in-plane slow axis of the second optically anisotropic layer 14A and the in-plane slow axis of the third optically anisotropic layer 16A on the surface on the second optically anisotropic layer 14A side is within a range of 0° to 30° and preferably within a range of 0° to 20°.

The type of the rod-like liquid crystal compound used for forming the third optically anisotropic layer 16A is not particularly limited, and examples thereof include known compounds.

Examples of the rod-like liquid crystal compound include the compounds described in claim 1 of JP1999-513019A (JP-H11-513019A) and paragraphs [0026] to [0098] of JP2005-289980A.

The rod-like liquid crystal compound may have a polymerizable group.

The types of polymerizable groups that the rod-like liquid crystal compound may have are as described above.

The third optically anisotropic layer 16A is preferably a layer formed by fixing a rod-like liquid crystal compound having a polymerizable group by polymerization. More specifically, the third optically anisotropic layer 16A is more preferably a layer formed by fixing a rod-like liquid crystal compound having a polymerizable group twist-aligned by polymerization.

The thickness of the third optically anisotropic layer 16A is not particularly limited, and is preferably 10 μm or less, more preferably 0.1 to 5.0 μm, and still more preferably 0.3 to 2.0 μm.

The thickness of the third optically anisotropic layer 16A is intended to refer to an average thickness of the third optically anisotropic layer 16A. The average thickness is obtained by measuring the thicknesses of any five or more points of the third optically anisotropic layer 16A and arithmetically averaging the measured values.

Fourth Optically Anisotropic Layer 18A

The fourth optically anisotropic layer 18A is a positive C-plate.

The thickness direction retardation of the fourth optically anisotropic layer 18A at a wavelength of 550 nm is not particularly limited, and is preferably −100 to −5 nm and more preferably −100 to −30 nm from the viewpoint that the effect of the present invention is more excellent.

The configuration of the fourth optically anisotropic layer 18A is not particularly limited as long as it is a positive C-plate, and examples thereof include a layer formed by fixing a rod-like liquid crystal compound vertically aligned and a resin film, among which a layer formed by fixing a rod-like liquid crystal compound vertically aligned is preferable from the viewpoint that the effect of the present invention is more excellent.

The state in which the rod-like liquid crystal compound is vertically aligned means that the major axis of the rod-like liquid crystal compound is parallel to the thickness direction of the fourth optically anisotropic layer 18A. It is not required to be strictly parallel, and the angle formed by the major axis of the rod-like liquid crystal compound and the thickness direction of the fourth optically anisotropic layer 18A is preferably in a range of 0°±20° and more preferably in a range of 0°±10°.

A known compound can be used as the rod-like liquid crystal compound.

Examples of the rod-like liquid crystal compound include the rod-like liquid crystal compound exemplified in the third optically anisotropic layer 16A.

The rod-like liquid crystal compound may have a polymerizable group.

The types of polymerizable groups that the rod-like liquid crystal compound may have are as described above.

The fourth optically anisotropic layer 18A is preferably a layer formed by fixing a rod-like liquid crystal compound having a polymerizable group vertically aligned by polymerization.

The thickness of the fourth optically anisotropic layer 18A is not particularly limited, and is preferably 10 μm or less, more preferably 0.1 to 5.0 μm, and still more preferably 0.3 to 2.0 μm.

The thickness of the fourth optically anisotropic layer 18A is intended to refer to an average thickness of the fourth optically anisotropic layer 18A. The average thickness is obtained by measuring the thicknesses of any five or more points of the fourth optically anisotropic layer 18A and arithmetically averaging the measured values.

Other Members

The phase difference film 10A may include members other than the above-mentioned first optically anisotropic layer 12A to fourth optically anisotropic layer 18A.

Adhesion Layer

The phase difference film 10A may have an adhesion layer between the optically anisotropic layers.

Examples of the adhesion layer include known pressure sensitive adhesive layers and adhesive layers.

As described in JP1999-149015A (JP-H11-149015A), it is generally preferable to adjust the refractive index of each layer (for example, an optically anisotropic layer) forming the phase difference film from the viewpoint of suppressing reflection. The difference in refractive index from that of an adhesion target is preferably 0.1 or less, more preferably 0.08 or less, still more preferably 0.06 or less, and particularly preferably 0.03 or less.

The thickness of the adhesion layer is preferably 0.1 to 50 µm. From the viewpoint of thinning, the thickness of the adhesion layer is more preferably 25 µm or less, still more preferably 15 µm or less, and particularly preferably 5 µm or less. From the viewpoint of suppressing interference unevenness, the thickness of the adhesion layer is more preferably 5 µm or more, still more preferably 15 µm or more, and particularly preferably 25 µm or more.

In a case where the adhesion layer is arranged between the layers of the optically anisotropic layers formed by fixing a liquid crystal compound, a high-refractive adhesive or pressure sensitive adhesive may be used.

In order to increase the refractive index, it is also preferable to use a high-refractive monomer or a high-refractive metal fine particle.

The high-refractive monomer preferably has a benzene ring skeleton in a molecule thereof. Examples of the monofunctional monomer having a benzene ring skeleton in a molecule thereof include ethoxylated o-phenylphenol (meth)acrylate, o-phenylphenol glycidyl ether (meth)acrylate, para-cumylphenoxyethylene glycol (meth)acrylate, 2-methacryloyloxyethyl phthalate, 2-acryloyloxyethyl phthalate, 2-acryloyloxyethyl-2-hydroxyethyl phthalate, 2-acryloyloxypropyl phthalate, phenoxyethyl (meth)acrylate, EO-modified phenol (meth)acrylate, phenoxydiethylene glycol (meth)acrylate, EO-modified nonylphenol (meth)acrylate, PO-modified nonylphenol (meth)acrylate, phenyl glycidyl ether (meth)acrylate, neopentyl glycol benzoate (meth)acrylate, nonylphenoxypolyethylene glycol (meth)acrylate, ECH-modified phenoxy (meth)acrylate, benzyl (meth)acrylate, and vinyl carbazole.

Examples of the high-refractive metal fine particle include an inorganic particle. Examples of the component constituting the inorganic particle include a metal oxide, a metal nitride, a metal oxynitride, and a simple substance of metal. Examples of the metal atom contained in the metal oxide, the metal nitride, the metal oxynitride, and the simple substance of metal include a titanium atom, a silicon atom, an aluminum atom, a cobalt atom, and a zirconium atom. Specific examples of the inorganic particle include inorganic oxide particles such as an alumina particle, an alumina hydrate particle, a silica particle, a zirconia particle, and a clay mineral (for example, smectite). A zirconium oxide particle is preferable in terms of refractive index.

The refractive index can be adjusted to a predetermined value by changing the amount of inorganic particles.

The average particle diameter of the inorganic particle is not particularly limited. In a case where zirconium oxide is used as a main component, the average particle diameter of the inorganic particle is preferably 1 to 120 nm, more preferably 1 to 60 nm, and still more preferably 2 to 40 nm.

Alignment Film

The phase difference film 10A may further have an alignment film. The alignment film may be arranged between the optically anisotropic layers.

As shown in FIG. 1, it is preferable that the phase difference film 10A does not have an alignment film between the optically anisotropic layers.

The alignment film can be formed by means such as rubbing treatment of an organic compound (preferably a polymer), oblique vapor deposition of an inorganic compound, formation of a layer having microgrooves, or accumulation of an organic compound (for example, co-tricosanoic acid, dioctadecylmethylammonium chloride, or methyl stearate) by the Langmuir-Blodgett (LB) film technique.

Further, there is also known an alignment film capable of expressing an alignment function by application of an electric field, application of a magnetic field, or light (preferably polarized light) irradiation.

The alignment film is preferably formed by a rubbing treatment of a polymer.

Examples of the alignment film include a photo-alignment film.

The thickness of the alignment film is not particularly limited as long as it can exhibit an alignment function, and is preferably 0.01 to 5.0 µm, more preferably 0.05 to 2.0 µm, and still more preferably 0.1 to 0.5 µm.

Substrate

The phase difference film 10A may further have a substrate.

The substrate is preferably a transparent substrate. The transparent substrate is intended to refer to a substrate having a visible light transmittance of 60% or more, which preferably has a visible light transmittance of 80% or more and more preferably 90% or more.

The thickness of the substrate is not particularly limited, and is preferably 10 to 200 µm, more preferably 10 to 100 µm, and still more preferably 20 to 90 µm.

In addition, the substrate may consist of a plurality of layers laminated. In order to improve the adhesion of the substrate to the layer provided thereon, the surface of the substrate may be subjected to a surface treatment (for example, a glow discharge treatment, a corona discharge treatment, an ultraviolet (UV) treatment, or a flame treatment).

In addition, an adhesive layer (undercoat layer) may be provided on the substrate.

The substrate may be a so-called temporary support. For example, after producing an optically anisotropic layer on a substrate, the substrate may be peeled off from the optically anisotropic layer, if necessary.

Method for Producing Phase Difference Film

The method for producing a phase difference film is not particularly limited, and a known method can be used.

For example, a phase difference film can be produced by preparing each of the first optically anisotropic layer to the fourth optically anisotropic layer and bonding the prepared optically anisotropic layers in a predetermined order through an adhesion layer (for example, a pressure sensitive adhesive layer or an adhesive layer).

In addition, the first optically anisotropic layer to the fourth optically anisotropic layer can be produced by using compositions for forming an optically anisotropic layer containing a liquid crystal compound having a polymerizable group, which can be formed respectively.

Hereinafter, the method for producing an optically anisotropic layer (first optically anisotropic layer to fourth optically anisotropic layer) using the composition for forming an optically anisotropic layer containing a liquid crystal compound having a polymerizable group will be described in detail.

The liquid crystal compound having a polymerizable group (hereinafter, also referred to as "polymerizable liquid crystal compound") contained in the composition for forming an optically anisotropic layer is as described above. As described above, a rod-like liquid crystal compound and a disk-like liquid crystal compound are appropriately selected according to the characteristics of an optically anisotropic layer to be formed.

The content of the polymerizable liquid crystal compound in the composition for forming an optically anisotropic layer is preferably 60% to 99% by mass and more preferably 70% to 98% by mass with respect to the total solid content of the composition for forming an optically anisotropic layer.

The solid content means a component capable of forming an optically anisotropic layer from which a solvent has been removed, and even in a case where a component itself is in a liquid state, such a component is regarded as the solid content.

The composition for forming an optically anisotropic layer may contain a compound other than the liquid crystal compound having a polymerizable group.

For example, the composition for forming an optically anisotropic layer for forming the third optically anisotropic layer 16A preferably contains a chiral agent in order to twist-align a liquid crystal compound. The chiral agent is added to twist-align a liquid crystal compound, but of course, it is not necessary to add the chiral agent in a case where the liquid crystal compound is a compound exhibiting an optical activity such as having an asymmetric carbon in a molecule thereof. In addition, it is not necessary to add the chiral agent, depending on the production method and the twisted angle.

The chiral agent is not particularly limited in a structure thereof as long as it is compatible with the liquid crystal compound used in combination. Any of the known chiral agents (for example, "Liquid Crystal Device Handbook" edited by the 142nd Committee of the Japan Society for the Promotion of Science, Chapter 3, 4-3, Chiral agent for TN and STN, p. 199, 1989) can be used.

The amount of the chiral agent used is not particularly limited and is adjusted such that the above-mentioned twisted angle is achieved.

The composition for forming an optically anisotropic layer may contain a polymerization initiator. The polymerization initiator used is selected according to the type of polymerization reaction, and examples thereof include a thermal polymerization initiator and a photopolymerization initiator.

The content of the polymerization initiator in the composition for forming an optically anisotropic layer is preferably 0.01 to 20% by mass and more preferably 0.5 to 10% by mass with respect to the total solid content of the composition for forming an optically anisotropic layer.

Examples of other components that may be contained in the composition for forming an optically anisotropic layer include a polyfunctional monomer, an alignment control agent (a vertical alignment agent and a horizontal alignment agent), a surfactant, an adhesion improver, a plasticizer, and a solvent, in addition to the foregoing components.

Examples of the method of applying the composition for forming an optically anisotropic layer include a curtain coating method, a dip coating method, a spin coating method, a printing coating method, a spray coating method, a slot coating method, a roll coating method, a slide coating method, a blade coating method, a gravure coating method, and a wire bar method.

Next, the formed coating film is subjected to an alignment treatment to align a polymerizable liquid crystal compound in the coating film. For example, in a case where the first optically anisotropic layer 12A is formed, the disk-like liquid crystal compound is horizontally aligned. In addition, in a case where the second optically anisotropic layer 14A is formed, the disk-like liquid crystal compound is vertically aligned such that the optical axis (the axis orthogonal to the disc plane) of the disk-like liquid crystal compound is arranged in the same direction. In addition, in a case where the third optically anisotropic layer 16A is formed, the rod-like liquid crystal compound is twist-aligned. In addition, in a case where the fourth optically anisotropic layer 18A is formed, the rod-like liquid crystal compound is vertically aligned.

The alignment treatment can be carried out by drying the coating film at room temperature or by heating the coating film. In a case of a thermotropic liquid crystal compound, the liquid crystal phase formed by the alignment treatment can generally be transferred by a change in temperature or pressure. In a case of a lyotropic liquid crystal compound, the liquid crystal phase formed by the alignment treatment can also be transferred by a compositional ratio such as an amount of solvent.

The conditions for heating the coating film are not particularly limited, and the heating temperature is preferably 50° C. to 250° C. and more preferably 50° C. to 150° C., and the heating time is preferably 10 seconds to 10 minutes.

In addition, after the coating film is heated, the coating film may be cooled, if necessary, before a curing treatment (light irradiation treatment) which will be described later.

Next, the coating film in which the polymerizable liquid crystal compound is aligned is subjected to a curing treatment.

The method of the curing treatment carried out on the coating film in which the polymerizable liquid crystal compound is aligned is not particularly limited, and examples thereof include a light irradiation treatment and a heat treatment. Above all, from the viewpoint of manufacturing suitability, a light irradiation treatment is preferable, and an ultraviolet irradiation treatment is more preferable.

The irradiation conditions of the light irradiation treatment are not particularly limited, and an irradiation amount of 50 to 1,000 mJ/cm$^2$ is preferable.

The atmosphere during the light irradiation treatment is not particularly limited and is preferably a nitrogen atmosphere.

First Embodiment of Circularly Polarizing Plate

The first embodiment of the phase difference film according to the embodiment of the present invention can be used as a circularly polarizing plate in combination with a polarizes. The circularly polarizing plate is an optical element that converts unpolarized light into circularly polarized light.

The circularly polarizing plate according to the embodiment of the present invention having the above configuration is suitably used for antireflection applications of a display device such as a liquid crystal display device (LCD), a plasma display panel (PDP), an electroluminescent display (ELD), or a cathode tube display device (CRT).

The polarizer may be a member having a function of converting natural light into specific linearly polarized light, and examples thereof include an absorption type polarizer.

The type of the polarizer is not particularly limited, and a commonly used polarizer can be used. Examples of the polarizer include an iodine-based polarizer, a dye-based polarizer using a dichroic substance, and a polyene-based polarizer. The iodine-based polarizer and the dye-based polarizer are generally prepared by adsorbing iodine or a dichroic dye on a polyvinyl alcohol, followed by stretching.

A protective film may be arranged on one side or both sides of the polarizer.

Figure 2:
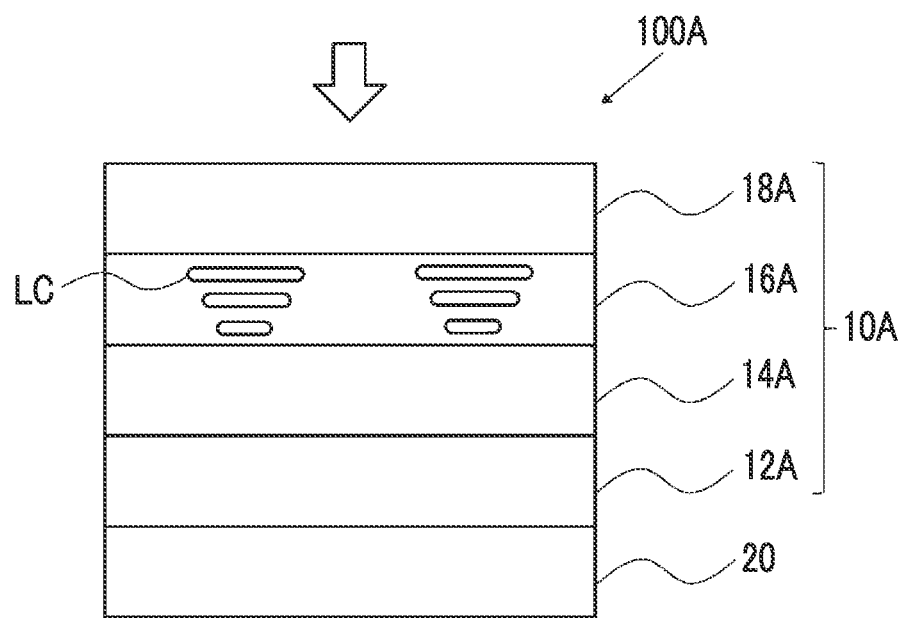
FIG. 2 is an example of a schematic cross-sectional view of a first embodiment of a circularly polarizing plate of the present invention.
Figure 3:
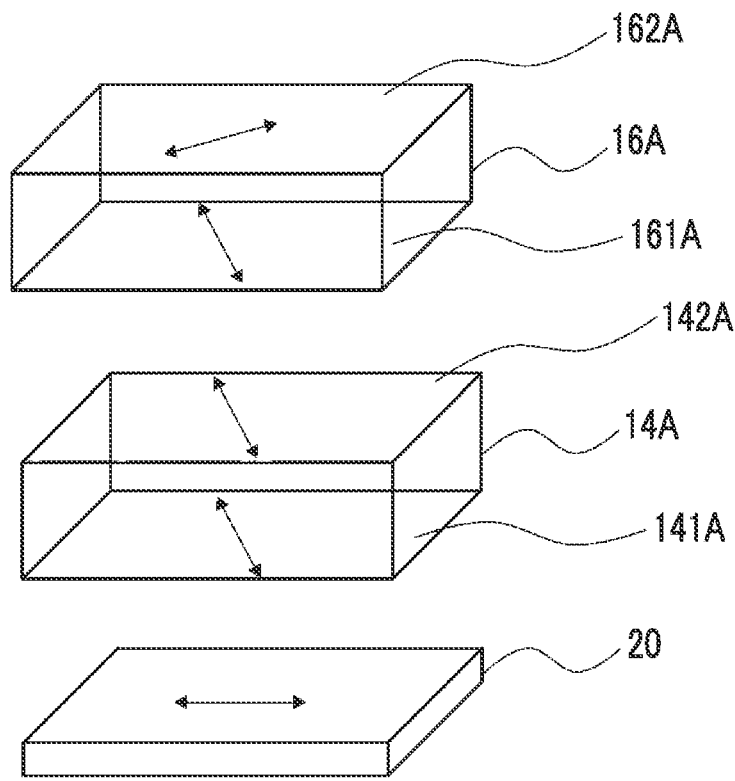
FIG. 3 is a view showing a relationship between an absorption axis of a polarizer and an in-plane slow axis of each of a second optically anisotropic layer and a third optically anisotropic layer in the first embodiment of the circularly polarizing plate of the present invention.

FIG. 2 shows a schematic cross-sectional view of an embodiment of a circularly polarizing plate 100A. In addition, FIG. 3 is a view showing a relationship between an absorption axis of a polarizer 20 and an in-plane slow axis of each of the second optically anisotropic layer 14A and the third optically anisotropic layer 16A in the circularly polarizing plate 100A shown in FIG. 2. In FIG. 3, the arrow in the polarizer 20 indicates an absorption axis, and the arrow in the second optically anisotropic layer 14A and the third optically anisotropic layer 16A indicates an in-plane slow axis in each layer.

Figure 4:
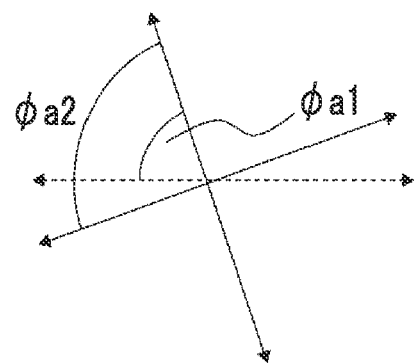
FIG. 4 is a schematic diagram showing a relationship of an angle between the absorption axis of the polarizer and the in-plane slow axis of each of the second optically anisotropic layer and the third optically anisotropic layer, upon observation from the direction of a white arrow in FIG. 2.

In addition, FIG. 4 is a view showing a relationship of the angle between the absorption axis (broken line) of the polarizer 20 and the in-plane slow axis (solid line) of each of the second optically anisotropic layer 14A and the third optically anisotropic layer 16A, upon observation from the white arrow in FIG. 2.

The rotation angle of the in-plane slow axis is represented by a positive angle value in a counterclockwise direction and a negative angle value in a clockwise direction, with respect to the absorption axis of the polarizer 20 (0°), upon observation from the white arrow in FIG. 2. In addition, whether the twisted direction of the liquid crystal compound is a right-handed twist (clockwise) or a left-handed twist (counterclockwise) is determined with reference to the in-plane slow axis on the surface of the front side (the side opposite to the polarizer 20 side) in the third optically anisotropic layer 16A, upon observation from the white arrow in FIG. 2.

As shown in FIG. 2, the circularly polarizing plate 100A includes the polarizer 20, the first optically anisotropic layer 12A, the second optically anisotropic layer 14A, the third optically anisotropic layer 16A, and the fourth optically anisotropic layer 18A in this order.

As shown in FIG. 3 and FIG. 4, an angle φa1 formed by the absorption axis of the polarizer 20 and the in-plane slow axis of the second optically anisotropic layer 14A is 75°. More specifically, the in-plane slow axis of the second optically anisotropic layer 14A is rotated by −75° (clockwise 75°) with respect to the absorption axis of the polarizer 20. Although FIG. 3 and FIG. 4 show an aspect in which the in-plane slow axis of the second optically anisotropic layer 14A is at a position of −75°, the present invention is not limited to this aspect. The in-plane slow axis of the second optically anisotropic layer 14A is preferably within a range of −75°±13°. That is, the angle formed by the absorption axis of the polarizer 20 and the in-plane slow axis of the second optically anisotropic layer 14A is preferably within a range of 75°±13°.

As shown in FIG. 3, in the second optically anisotropic layer 14A, the in-plane slow axis on a surface 141A of the second optically anisotropic layer 14A on the polarizer 20 side is parallel to the in-plane slow axis on a surface 142A of the second optically anisotropic layer 14A on the third optically anisotropic layer 16A side.

As shown in FIG. 3 and FIG. 4, the in-plane slow axis of the second optically anisotropic layer 14A is parallel to the in-plane slow axis on a surface 161A of the third optically anisotropic layer 16A on the second optically anisotropic layer 14A side.

Although FIG. 3 and FIG. 4 show an aspect in which the in-plane slow axis of the second optically anisotropic layer 14A is parallel to the in-plane slow axis on the surface 161A of the third optically anisotropic layer 16A on the second optically anisotropic layer 14A side, the present invention is not limited to this aspect. The angle formed by the in-plane slow axis of the second optically anisotropic layer 14A and the in-plane slow axis of the third optically anisotropic layer 16A on the surface 161A on the second optically anisotropic layer 14A side may be within a range of 0° to 30°. Therefore, for example, the in-plane slow axis on the surface 161A of the third optically anisotropic layer 16A on the second optically anisotropic layer 14A side may be arranged at a position of 30° clockwise or may be arranged at a position of 30° counterclockwise, with reference to the in-plane slow axis of the second optically anisotropic layer 14A, upon observation from the white arrow in FIG. 2.

As described above, the third optically anisotropic layer 16A is a layer formed by fixing a rod-like liquid crystal compound twist-aligned along a helical axis extending in a thickness direction. Therefore, as shown in FIG. 3 and FIG. 4, the in-plane slow axis on the surface 161A of the third optically anisotropic layer 16A on the second optically anisotropic layer 14A side and the in-plane slow axis on the surface 162A of the third optically anisotropic layer 16A opposite to the second optically anisotropic layer 14A side form the above-mentioned twisted angle (80° in FIG. 3). That is, an angle φa2 formed by the in-plane slow axis on the surface 161A of the third optically anisotropic layer 16A on the second optically anisotropic layer 14A side and the in-plane slow axis on the surface 162A of the third optically anisotropic layer 16A opposite to the second optically anisotropic layer 14A side is 80°. More specifically, the twisted direction of the rod-like liquid crystal compound in the third optically anisotropic layer 16A is a right-handed twist (clockwise), and the twisted angle is 80°. Therefore, the angle formed by the absorption axis of the polarizer 20 and the in-plane slow axis of the third optically anisotropic layer 16A on the surface 162A opposite to the second optically anisotropic layer 14A side is 5°.

Although FIG. 3 and FIG. 4 show an aspect in which the twisted angle of the rod-like liquid crystal compound in the third optically anisotropic layer 16A is 80°, the present invention is not limited to this aspect. The twisted angle of the rod-like liquid crystal compound is preferably within a range of 80°±30°. That is, the angle formed by the in-plane slow axis of the third optically anisotropic layer 16A on the surface 161A on the second optically anisotropic layer 14A side and the in-plane slow axis of the third optically anisotropic layer 16A on the surface 162A opposite to the second optically anisotropic layer 14A side is preferably within a range of 80°±30°.

As described above, in the aspect of FIG. 3 and FIG. 4, the in-plane slow axis of the second optically anisotropic layer 14A is rotated clockwise by 75°, and the twisted direction of the rod-like liquid crystal compound in the third optically anisotropic layer 16A is clockwise (right-handed twist), with reference to the absorption axis of the polarizer 20, upon observation of the circularly polarizing plate 100A from the phase difference film 10A side.

In FIG. 3 and FIG. 4, the aspect in which the twisted direction of the rod-like liquid crystal compound is clockwise is described in detail, but an aspect in which the twisted direction of the rod-like liquid crystal compound is counterclockwise may be configured as long as the relationship of a predetermined angle is satisfied. More specifically, it may be an aspect in which the in-plane slow axis of the second optically anisotropic layer 14A is rotated counterclockwise by 75°, and the twisted direction of the rod-like liquid crystal compound in the third optically anisotropic layer 16A is counterclockwise (left-handed twist), with reference to the absorption axis of the polarizer 20, upon observation of the circularly polarizing plate 100A from the phase difference film 10A side.

That is, in the circularly polarizing plate including the first embodiment of the phase difference film, in a case where the in-plane slow axis of the second optically anisotropic layer is rotated clockwise within a range of 75°±13° (preferably 75°±10°) with reference to the absorption axis of the polarizer, upon observation of the circularly polarizing plate from the phase difference film side, it is preferable that the twisted direction of the rod-like liquid crystal compound in the third optically anisotropic layer is clockwise with reference to the in-plane slow axis on the surface of the third optically anisotropic layer on the fourth optically anisotropic layer side.

In addition, in the circularly polarizing plate including the first embodiment of the phase difference film, in a case where the in-plane slow axis of the second optically anisotropic layer is rotated counterclockwise within a range of 75°±13° (preferably 75°±10°) with reference to the absorption axis of the polarizer, upon observation of the circularly polarizing plate from the phase difference film side, it is preferable that the twisted direction of the rod-like liquid crystal compound in the third optically anisotropic layer is counterclockwise with reference to the in-plane slow axis on the surface of the third optically anisotropic layer on the fourth optically anisotropic layer side.

The circularly polarizing plate may have a member other than the phase difference film and the polarizer.

The circularly polarizing plate may have an adhesion layer between the phase difference film and the polarizer.

Examples of the adhesion layer include the above-mentioned known pressure sensitive adhesive layers and adhesive layers.

The method for producing a circularly polarizing plate is not particularly limited, and a known method can be mentioned.

For example, a method of bonding a polarizer and a phase difference film through an adhesion layer can be mentioned.

Second embodiment of phase difference film

Figure 5:
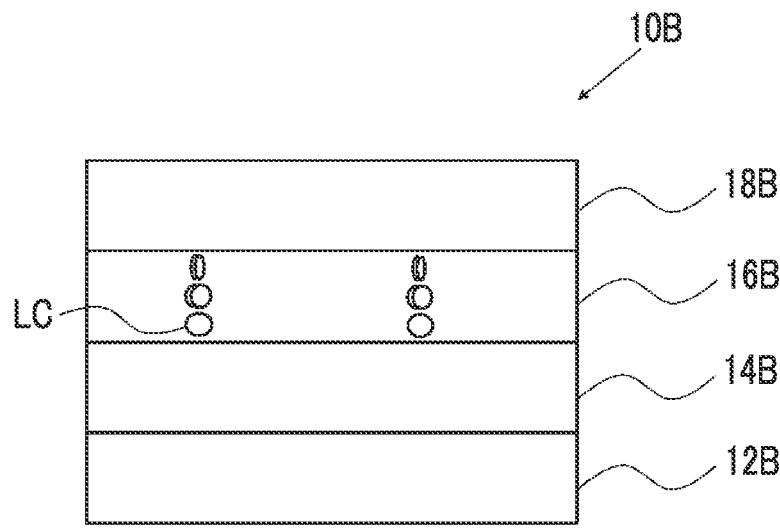
FIG. 5 is an example of a schematic cross-sectional view of a second embodiment of the phase difference film of the present invention.

Hereinafter, the second embodiment of the phase difference film according to the embodiment of the present invention will be described with reference to the accompanying drawings. FIG. 5 shows a schematic cross-sectional view of the second embodiment of the phase difference film according to the embodiment of the present invention.

A phase difference film 10B has a first optically anisotropic layer 12B, a second optically anisotropic layer 14B, a third optically anisotropic layer 16B, and a fourth optically anisotropic layer 18B in this order.

The first optically anisotropic layer 12B is a positive C-plate, the second optically anisotropic layer 14B is a positive A-plate, the third optically anisotropic layer 16B is a layer formed by fixing a disk-like liquid crystal compound LC twist-aligned along a helical axis extending in a thickness direction, and the fourth optically anisotropic layer 18B is a negative C-plate.

Hereinafter, each layer will be described in detail.

First Optically Anisotropic Layer 12B

The first optically anisotropic layer 12B is a positive C-plate.

The thickness direction retardation of the first optically anisotropic layer 12B at a wavelength of 550 nm is not particularly limited, and is preferably −100 to −5 nm and more preferably −90 to −10 nm from the viewpoint that the effect of the present invention is more excellent.

The configuration of the first optically anisotropic layer 12B is not particularly limited as long as it is a positive C-plate, and examples thereof include a layer formed by fixing a rod-like liquid crystal compound vertically aligned and a resin film, among which a layer formed by fixing a rod-like liquid crystal compound vertically aligned is preferable from the viewpoint that the effect of the present invention is more excellent.

The state in which the rod-like liquid crystal compound is vertically aligned means that the major axis of the rod-like liquid crystal compound is parallel to the thickness direction of the first optically anisotropic layer 12B. It is not required to be strictly parallel, and the angle formed by the major axis of the rod-like liquid crystal compound and the thickness direction of the first optically anisotropic layer 12B is preferably in a range of 0°±20' and more preferably in a range of 0°±10°.

A known compound can be used as the rod-like liquid crystal compound.

Specific examples of the rod-like liquid crystal compound are as described in the first embodiment of the phase difference film.

The rod-like liquid crystal compound may have a polymerizable group.

The types of polymerizable groups that the rod-like liquid crystal compound may have are as described above.

The first optically anisotropic layer 12B is preferably a layer formed by fixing a rod-like liquid crystal compound having a polymerizable group vertically aligned by polymerization.

The thickness of the first optically anisotropic layer 12B is not particularly limited, and is preferably 10 µm or less, more preferably 0.1 to 5.0 µm, and still more preferably 0.3 to 2.0 µm.

The thickness of the first optically anisotropic layer 12B is intended to refer to an average thickness of the first optically anisotropic layer 12B. The average thickness is obtained by measuring the thicknesses of any five or more points of the first optically anisotropic layer 12B and arithmetically averaging the measured values.

Second Optically Anisotropic Layer 14B

The second optically anisotropic layer 14B is a positive A-plate.

The in-plane retardation of the second optically anisotropic layer 14B at a wavelength of 550 nm is not particularly limited, and is preferably 120 to 240 nm and more preferably 130 to 230 nm from the viewpoint that the effect of the present invention is more excellent.

The thickness direction retardation of the second optically anisotropic layer 14B at a wavelength of 550 nm is not particularly limited, and is preferably 60 to 120 nm and more preferably 65 to 115 nm from the viewpoint that the effect of the present invention is more excellent.

The second optically anisotropic layer 14B may exhibit forward wavelength dispersibility (characteristic that the in-plane retardation decreases as the measurement wavelength increases) or reverse wavelength dispersibility (characteristic that the in-plane retardation increases as the measurement wavelength increases). The forward wavelength dispersibility and the reverse wavelength dispersibility are preferably exhibited in the visible light region.

The configuration of the second optically anisotropic layer 14B is not particularly limited as long as it is a positive A-plate, and examples thereof include a layer formed by fixing a rod-like liquid crystal compound homogeneously aligned and a stretching film, among which a layer formed by fixing a rod-like liquid crystal compound homogeneously aligned is preferable from the viewpoint that the effect of the present invention is more excellent.

The homogeneous alignment in the present specification refers to a state in which a molecular axis of a liquid crystal compound (for example, a major axis in a case of a rod-like liquid crystal compound) is arranged horizontally and in the same direction with respect to the layer surface (optical uniaxiality).

Here, "horizontal" does not require that the molecular axis of the liquid crystal compound is strictly horizontal with respect to the surface of the composition layer, but is intended to mean an alignment in which the tilt angle formed by the average molecular axis of the liquid crystal compound and the main surface of the layer is less than 20°.

In addition, the same direction does not require that the molecular axis of the liquid crystal compound is arranged strictly in the same direction with respect to the surface of the composition layer, but is intended to mean that, in a case where the direction of the slow axis is measured at any 20 positions in the plane, the maximum difference between the slow axis directions among the slow axis directions at 20 positions (the difference between the two slow axis directions having a maximum difference among the 20 slow axis directions) is less than 10°.

Specific examples of the rod-like liquid crystal compound are as described in the first embodiment of the phase difference film.

The rod-like liquid crystal compound may have a polymerizable group.

The types of polymerizable groups that the rod-like liquid crystal compound may have are as described above.

The second optically anisotropic layer 14B is preferably a layer formed by fixing a rod-like liquid crystal compound having a polymerizable group by polymerization.

The thickness of the second optically anisotropic layer 14B is not particularly limited, and is preferably 10 μm or less, more preferably 0.1 to 5.0 μm, and still more preferably 0.3 to 2.0 μm.

The thickness of the second optically anisotropic layer 14B is intended to refer to an average thickness of the second optically anisotropic layer 14B. The average thickness is obtained by measuring the thicknesses of any five or more points of the second optically anisotropic layer 14B and arithmetically averaging the measured values.

Third Optically Anisotropic Layer 16B

The third optically anisotropic layer 16B is a layer formed by fixing a disk-like liquid crystal compound LC twist-aligned along a helical axis extending in a thickness direction.

In a case of forming the third optically anisotropic layer 16B, it is preferable to use at least a disk-like liquid crystal compound and a chiral agent.

The twisted angle of the disk-like liquid crystal compound (twisted angle of the disk-like liquid crystal compound in an alignment direction) is not particularly limited, and is often more than 0° and 360° or less. From the viewpoint that the effect of the present invention is more excellent, the twisted angle of the disk-like liquid crystal compound is preferably within a range of 80°+30° (within a range of 50° to 110°) and more preferably within a range of 80°±20° (within a range of 60° to 100°).

The twisted angle is measured using an AxoScan (polarimeter) device manufactured by Axometrics, Inc. and using device analysis software of Axometrics, Inc.

In addition, the phrase "the disk-like liquid crystal compound is twist-aligned" is intended to mean that the disk-like liquid crystal compound from one main surface to the other main surface of the third optically anisotropic layer 16B is twisted about the thickness direction of the third optically anisotropic layer 16B. Along with this, the alignment direction (in-plane slow axis direction) of the disk-like liquid crystal compound differs depending on the position of the third optically anisotropic layer 16B in a thickness direction.

In the twisted alignment, the disk-like liquid crystal compound is vertically aligned. The state in which a disk-like liquid crystal compound is vertically aligned means that the disc plane of the disk-like liquid crystal compound and the thickness direction of the third optically anisotropic layer 16B are parallel to each other. It is not required to be strictly parallel, and the angle formed by the disc plane and the thickness direction of the third optically anisotropic layer 16B is preferably in a range of 0°±20° and more preferably in a range of 0°±10°.

The angle formed by the in-plane slow axis of the second optically anisotropic layer 14B and the in-plane slow axis of the third optically anisotropic layer 16B on the surface on the second optically anisotropic layer 14B side is within a range of 0° to 30° and preferably within a range of 0° to 20°.

The value of the product Δnd of the refractive index anisotropy Δn of the third optically anisotropic layer 16B at a wavelength of 550 nm and the thickness d of the third optically anisotropic layer 16B is not particularly limited, and is preferably 120 to 240 nm and more preferably 130 to 230 nm from the viewpoint that the effect of the present invention is more excellent.

The Δnd is measured using an AxoScan (polarimeter) device manufactured by Axometrics, Inc. and using device analysis software of Axometrics, Inc.

The type of the disk-like liquid crystal compound used for forming the third optically anisotropic layer 16B is not particularly limited, and examples thereof include known compounds.

The disk-like liquid crystal compound may have a polymerizable group.

The types of polymerizable groups that the disk-like liquid crystal compound may have are as described above.

The third optically anisotropic layer 16B is preferably a layer formed by fixing a disk-like liquid crystal compound having a polymerizable group by polymerization. More specifically, the third optically anisotropic layer 16B is more preferably a layer formed by fixing a disk-like liquid crystal compound having a polymerizable group twist-aligned by polymerization.

The thickness of the third optically anisotropic layer 16B is not particularly limited, and is preferably 10 μm or less, more preferably 0.1 to 5.0 μm, and still more preferably 0.3 to 2.0 μm.

The thickness of the third optically anisotropic layer 16B is intended to refer to an average thickness of the third optically anisotropic layer 16B. The average thickness is obtained by measuring the thicknesses of any five or more points of the third optically anisotropic layer 16B and arithmetically averaging the measured values.

Fourth Optically Anisotropic Layer 18B

The fourth optically anisotropic layer 18B is a negative C-plate.

The thickness direction retardation of the fourth optically anisotropic layer 18B at a wavelength of 550 nm is not particularly limited, and is preferably 5 to 100 nm and more preferably 10 to 80 nm from the viewpoint that the effect of the present invention is more excellent.

The configuration of the fourth optically anisotropic layer 18B is not particularly limited as long as it is a negative C-plate, and examples thereof include a layer formed by fixing a disk-like liquid crystal compound horizontally aligned and a resin film, among which a layer formed by fixing a disk-like liquid crystal compound horizontally aligned is preferable from the viewpoint that the effect of the present invention is more excellent.

A known compound can be used as the disk-like liquid crystal compound.

Examples of the disk-like liquid crystal compound include the disk-like liquid crystal compound exemplified in the second optically anisotropic layer 14k The disk-like liquid crystal compound may have a polymerizable group.

The types of polymerizable groups that the disk-like liquid crystal compound may have are as described above.

The type of the resin constituting the resin film is not particularly limited, and examples thereof include triacetyl cellulose (TAC).

The fourth optically anisotropic layer 18B is preferably a layer formed by fixing a disk-like liquid crystal compound having a polymerizable group horizontally aligned by polymerization.

The thickness of the fourth optically anisotropic layer 18B is not particularly limited. In a case where the fourth optically anisotropic layer 18B is a layer formed by fixing a disk-like liquid crystal compound horizontally aligned, the thickness of the fourth optically anisotropic layer 18B is preferably 10 μm or less, more preferably 0.1 to 5.0 μm, and still more preferably 0.3 to 2.0 μm.

In a case where the fourth optically anisotropic layer 18B is a resin film, the thickness of the fourth optically anisotropic layer 18B is preferably 10 to 100 μm and more preferably 15 to 90 μm.

The thickness of the fourth optically anisotropic layer 18B is intended to refer to an average thickness of the fourth optically anisotropic layer 18B. The average thickness is obtained by measuring the thicknesses of any five or more points of the fourth optically anisotropic layer 18B and arithmetically averaging the measured values.

Other Members

The phase difference film 10B may include members other than the above-mentioned first optically anisotropic layer 12B to fourth optically anisotropic layer 18B.

Examples of other members include the other members described in the first embodiment of the phase difference film described above.

The methods for producing the first optically anisotropic layer 12B to the fourth optically anisotropic layer 18B are not particularly limited, and the above-mentioned methods for producing the first optically anisotropic layer 12A to the fourth optically anisotropic layer 18A can be mentioned.

Second Embodiment of Circularly Polarizing Plate

The second embodiment of the phase difference film according to the embodiment of the present invention can be used as a circularly polarizing plate in combination with a polarizer.

The circularly polarizing plate according to the embodiment of the present invention having the above configuration is suitably used for antireflection applications of a display device such as a liquid crystal display device (LCD), a plasma display panel (PDP), an electroluminescent display (ELD), or a cathode tube display device (CRT).

The polarizer is as described in the first embodiment.

Figure 6:
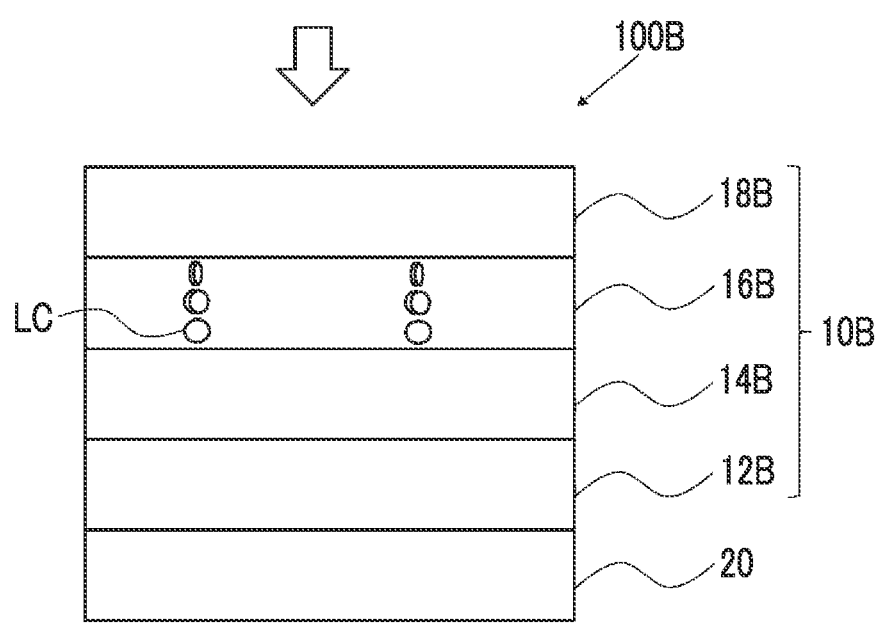
FIG. 6 is an example of a schematic cross-sectional view of a second embodiment of the circularly polarizing plate of the present invention.
Figure 7:
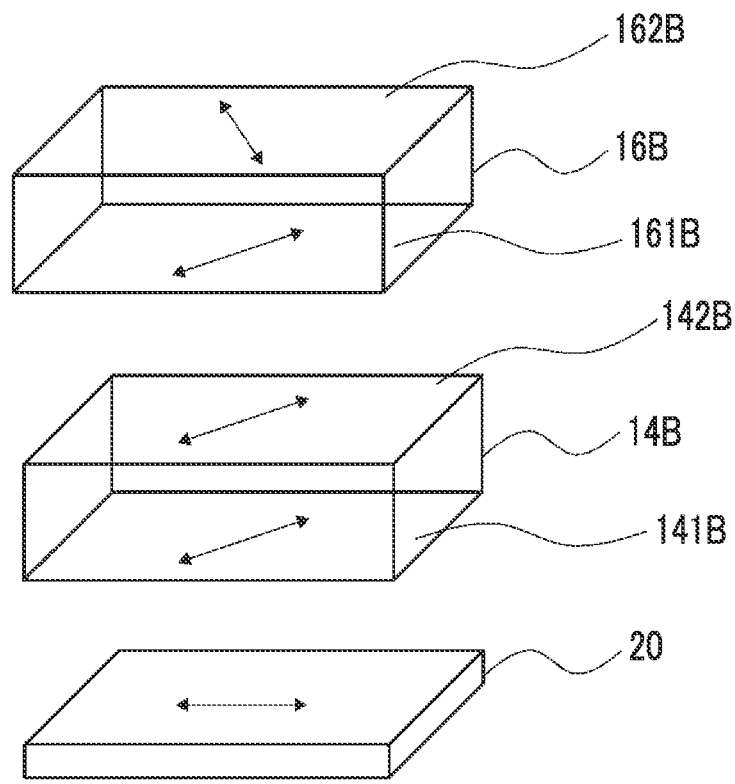
FIG. 7 is a view showing a relationship between the absorption axis of the polarizer and the in-plane slow axis of each of the second optically anisotropic layer and the third optically anisotropic layer in the second embodiment of the circularly polarizing plate of the present invention.

FIG. 6 shows a schematic cross-sectional view of an embodiment of a circularly polarizing plate 100B. In addition, FIG. 7 is a view showing a relationship between the absorption axis of the polarizes 20 and the in-plane slow axis of each of the second optically anisotropic layer 14B and the third optically anisotropic layer 16B in the circularly polarizing plate 100B shown in FIG. 6. In FIG. 7, the arrow in the polarizer 20 indicates an absorption axis, and the arrow in the second optically anisotropic layer 14B and the third optically anisotropic layer 16B indicates an in-plane slow axis in each layer.

Figure 8:
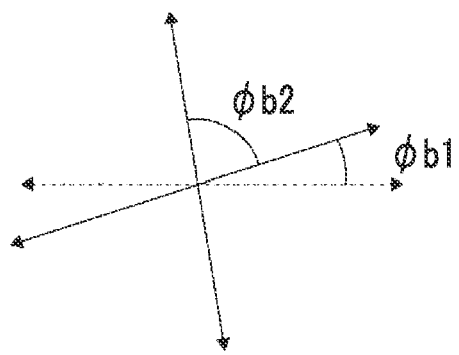
FIG. 8 is a schematic diagram showing a relationship of an angle between the absorption axis of the polarizer and the in-plane slow axis of each of the second optically anisotropic layer and the third optically anisotropic layer, upon observation from the direction of a white arrow in FIG. 6.

In addition, FIG. 8 is a view showing a relationship of the angle between the absorption axis (broken line) of the polarizer 20 and the in-plane slow axis (solid line) of each of the second optically anisotropic layer 14B and the third optically anisotropic layer 16B, upon observation from the white arrow in FIG. 6.

The rotation angle of the in-plane slow axis is represented by a positive angle value in a counterclockwise direction and a negative angle value in a clockwise direction, with respect to the absorption axis of the polarizer 20 (0°), upon observation from the white arrow in FIG. 6. In addition, whether the twisted direction is a right-handed twist (clockwise) or a left-handed twist (counterclockwise) is determined with reference to the in-plane slow axis on the surface of the front side (the side opposite to the polarizer 20) in the third optically anisotropic layer 16B, upon observation from the white arrow in FIG. 6.

As shown in FIG. 6, the circularly polarizing plate 100B includes the polarizer 20, the first optically anisotropic layer 12B, the second optically anisotropic layer 14B, the third optically anisotropic layer 16B, and the fourth optically anisotropic layer 18B in this order.

As shown in FIG. 7 and FIG. 8, an angle φb1 formed by the absorption axis of the polarizer 20 and the in-plane slow axis of the second optically anisotropic layer 14B is 15°. More specifically, the in-plane slow axis of the second optically anisotropic layer 14B is rotated by 15° (counterclockwise 15°) with respect to the absorption axis of the polarizer 20. Although FIG. 7 and FIG. 8 show an aspect in which the in-plane slow axis of the second optically anisotropic layer 14B is at a position of 15°, the present invention is not limited to this aspect. The in-plane slow axis of the second optically anisotropic layer 14B is preferably within a range of 15°±13°. That is, the angle formed by the absorption axis of the polarizer 20 and the in-plane slow axis of the second optically anisotropic layer 14B is preferably within a range of 15°±13°.

As shown in FIG. 7, in the second optically anisotropic layer 14B, the in-plane slow axis on a surface 141B of the second optically anisotropic layer 14B on the polarizer 20 side is parallel to the in-plane slow axis on a surface 142B of the second optically anisotropic layer 14B on the third optically anisotropic layer 16B side.

As shown in FIG. 7 and FIG. 8, the in-plane slow axis of the second optically anisotropic layer 14B is parallel to the in-plane slow axis on a surface 161B of the third optically anisotropic layer 16B on the second optically anisotropic layer 14B side.

Although FIG. 7 and FIG. 8 show an aspect in which the in-plane slow axis of the second optically anisotropic layer 14B is parallel to the in-plane slow axis on the surface 161B of the third optically anisotropic layer 16B on the second optically anisotropic layer 14B side, the present invention is not limited to this aspect. The angle formed by the in-plane slow axis of the second optically anisotropic layer 14B and the in-plane slow axis of the third optically anisotropic layer 16B on the surface 161B on the second optically anisotropic layer 14B side may be within a range of 0° to 30°. Therefore, for example, the in-plane slow axis on the surface 161B of the third optically anisotropic layer 16B on the second optically anisotropic layer 14B side may be arranged at a position of 30° clockwise or may be arranged at a position of 30° counterclockwise, with reference to the in-plane slow axis of the second optically anisotmpic layer 14B, upon observation from the white arrow in FIG. 6.

As described above, the third optically anisotropic layer 16B is a layer formed by fixing a disk-like liquid crystal compound twist-aligned along a helical axis extending in a thickness direction. Therefore, as shown in FIG. 7 and FIG. 8, the in-plane slow axis on the surface 161B of the third optically anisotropic layer 16B on the polarizer 20 side and the in-plane slow axis on the surface 162B of the third optically anisotropic layer 16B opposite to the polarizer 20 side form the above-mentioned twisted angle (80° in FIG. 7). That is, an angle φb2 formed by the in-plane slow axis on the surface 161B of the third optically anisotropic layer 16B on the second optically anisotropic layer 14B side and the in-plane slow axis on the surface 162B of the third optically anisotropic layer 16B opposite to the second optically anisotropic layer 14B side is 80°. More specifically, the twisted direction of the disk-like liquid crystal compound in the third optically anisotropic layer 16B is a right-handed twist (clockwise), and the twisted angle is 80°. Therefore, the angle formed by the absorption axis of the polarizer 20 and the in-plane slow axis of the third optically anisotropic layer 16B on the surface 162B opposite to the second optically anisotropic layer 14B side is 95°.

Although FIG. 7 and FIG. 8 show an aspect in which the twisted angle of the disk-like liquid crystal compound in the third optically anisotropic layer 16B is 80°, the present invention is not limited to this aspect. The twisted angle of the disk-like liquid crystal compound is preferably within a range of 80°±30°. That is, the angle formed by the in-plane slow axis of the third optically anisotropic layer 16B on the surface 161B on the second optically anisotropic layer 14B side and the in-plane slow axis of the third optically anisotropic layer 16B on the surface 162B opposite to the second optically anisotropic layer 14B side is preferably within a range of 80°±30°.

As described above, in the aspect of FIG. 7 and FIG. 8, the in-plane slow axis of the second optically anisotropic layer 14B is rotated counterclockwise by 15°, and the twisted direction of the disk-like liquid crystal compound in the third optically anisotropic layer 16B is clockwise (right-handed twist), with reference to the absorption axis of the polarizer 20, upon observation of the circularly polarizing plate 100B from the phase difference film 10B side.

In FIG. 7 and FIG. 8, the aspect in which the twisted direction of the disk-like liquid crystal compound is clockwise is described in detail, but an aspect in which the twisted direction of the disk-like liquid crystal compound is counterclockwise may be configured as long as the relationship of a predetermined angle is satisfied. More specifically, it may be an aspect in which the in-plane slow axis of the second optically anisotropic layer 14B is rotated clockwise by 15°, and the twisted direction of the disk-like liquid crystal compound in the third optically anisotropic layer 16B is counterclockwise (left-handed twist), with reference to the absorption axis of the polarizer 20, upon observation of the circularly polarizing plate 100B from the phase difference film 10B side.

That is, in the circularly polarizing plate including the second embodiment of the phase difference film, in a case where the in-plane slow axis of the second optically anisotropic layer is rotated counterclockwise within a range of 15°±13° (preferably 15°±10°) with reference to the absorption axis of the polarizer, upon observation of the circularly polarizing plate from the phase difference film side, it is preferable that the twisted direction of the liquid crystal compound in the third optically anisotropic layer is clockwise with reference to the in-plane slow axis on the surface of the third optically anisotropic layer on the fourth optically anisotropic layer side.

In addition, in the circularly polarizing plate including the second embodiment of the phase difference film, in a case where the in-plane slow axis of the second optically anisotropic layer is rotated clockwise within a range of 15°±13° (preferably 15°±10°) with reference to the absorption axis of the polarizer, upon observation of the circularly polarizing plate from the phase difference film side, it is preferable that the twisted direction of the liquid crystal compound in the third optically anisotropic layer is counterclockwise with reference to the in-plane slow axis on the surface of the third optically anisotropic layer on the fourth optically anisotropic layer side.

The circularly polarizing plate may have a member other than the phase difference film and the polarizer.

The circularly polarizing plate may have an adhesion layer between the phase difference film and the polarizer.

Examples of the adhesion layer include the above-mentioned known pressure sensitive adhesive layers and adhesive layers.

The method for producing a circularly polarizing plate is not particularly limited, and a known method can be mentioned.

For example, a method of bonding a polarizer and a phase difference film through an adhesion layer can be mentioned.

Third Embodiment of Phase Difference Film

Figure 9:
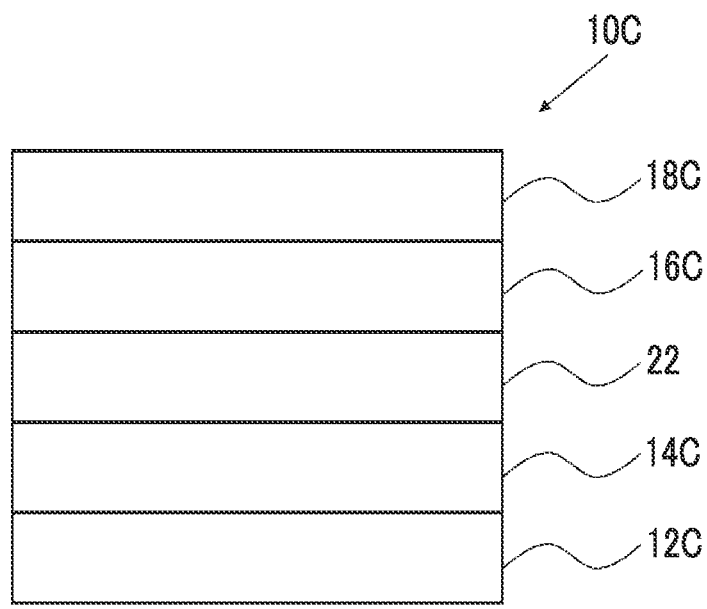
FIG. 9 is an example of a schematic cross-sectional view of a third embodiment of the phase difference film of the present invention.

Hereinafter, the third embodiment of the phase difference film according to the embodiment of the present invention will be described with reference to the accompanying drawings. FIG. 9 shows a schematic cross-sectional view of the third embodiment of the phase difference film according to the embodiment of the present invention.

A phase difference film 10C has a first optically anisotropic layer 12C, a second optically anisotropic layer 14C, a third optically anisotropic layer 16C, and a fourth optically anisotropic layer 18C in this order. The second optically anisotropic layer 14C and the third optically anisotropic layer 16C are laminated through an adhesion layer 22.

In FIG. 9, the first optically anisotropic layer 12C and the second optically anisotropic layer 14C are in direct contact with each other, the second optically anisotropic layer 14C and the third optically anisotropic layer 16C are laminated through the adhesion layer 22, and the third optically anisotropic layer 16C and the fourth optically anisotropic layer 18C are in direct contact with each other.

The first optically anisotropic layer 12C and the second optically anisotropic layer 14C are in direct contact with each other in FIG. 9, but the first optically anisotropic layer 12C and the second optically anisotropic layer 14C may be laminated through an adhesive layer by arrangement of the adhesive layer therebetween.

In addition, the third optically anisotropic layer 16C and the fourth optically anisotropic layer 18C are in direct contact with each other in FIG. 9, but the third optically anisotropic layer 16C and the fourth optically anisotropic layer 18C may be laminated through an adhesive layer by arrangement of the adhesive layer therebetween.

In addition, the second optically anisotropic layer 14C and the third optically anisotropic layer 16C are laminated through the adhesion layer 22 in FIG. 9, but the second optically anisotropic layer 14C and the third optically anisotropic layer 16C may be in direct contact with each other.

In the third embodiment of the phase difference film according to the embodiment of the present invention, at least one of the following Requirements 1 to 4 is satisfied. Above all, it is preferable to satisfy all of the Requirements 1 to 4 from the viewpoint that the effect of the present invention is more excellent.

Requirement 1: The difference between the average refractive index of the first optically anisotropic layer and the average refractive index of the layer in contact with the surface of the first optically anisotropic layer on the second optically anisotropic layer side is 0.10 or less.

Requirement 2: At least one of the difference between the average refractive index of the second optically anisotropic layer and the average refractive index of the layer in contact with the surface of the second optically anisotropic layer on the first optically anisotropic layer side, or the difference between the average refractive index of the second optically anisotropic layer and the average refractive index of the layer in contact with the surface of the second optically anisotropic layer on the third optically anisotropic layer side is 0.10 or less.

Requirement 3: At least one of the difference between the average refractive index of the third optically anisotropic layer and the average refractive index of the layer in contact with the surface of the third optically anisotropic layer on the second optically anisotropic layer side, or the difference between the average refractive index of the third optically anisotropic layer and the average refractive index of the layer in contact with the surface of the third optically anisotropic layer on the fourth optically anisotropic layer side is 0.10 or less.

Requirement 4: The difference between the average refractive index of the fourth optically anisotropic layer and the average refractive index of the layer in contact with the surface of the fourth optically anisotropic layer on the third optically anisotropic layer side is 0.10 or less.

Hereinafter, the Requirements 1 to 4 will be described by taking the phase difference film of FIG. 9 as an example.

The Requirement 1 specifies that the difference between the average refractive index of the first optically anisotropic layer and the average refractive index of the layer in contact with the surface of the first optically anisotropic layer on the second optically anisotropic layer side is 0.10 or less. In FIG. 9, the layer in contact with the surface of the first optically anisotropic layer 12C on the second optically anisotropic layer 14C side is the second optically anisotropic layer 14C itself. Therefore, in FIG. 9, the Requirement 1 is satisfied in a case where the difference between the average refractive index of the first optically anisotropic layer 12C and the average refractive index of the second optically anisotropic layer 14C is 0.10 or less.

The above difference is a value obtained by subtracting a smaller value from a larger value of the two average refractive indexes, and in a case where the two average refractive indexes are both the same value, the difference is zero.

FIG. 9 shows the aspect in which the first optically anisotropic layer and the second optically anisotropic layer are in direct contact with each other, but in a case where the first optically anisotropic layer and the second optically anisotropic layer are laminated through an adhesion layer, and therefore the first optically anisotropic layer and the adhesion layer are in contact with each other, the Requirement 1 is satisfied in a case where the difference between the average refractive index of the first optically anisotropic layer and the average refractive index of the adhesion layer is 0.10 or less.

The Requirement 2 specifies that at least one of the difference between the average refractive index of the second optically anisotropic layer and the average refractive index of the layer in contact with the surface of the second optically anisotropic layer on the first optically anisotropic layer side, or the difference between the average refractive index of the second optically anisotropic layer and the average refractive index of the layer in contact with the surface of the second optically anisotropic layer on the third optically anisotropic layer side is 0.10 or less. In FIG. 9, the layer in contact with the surface of the second optically anisotropic layer 14C on the first optically anisotropic layer 12C side is the first optically anisotropic layer 12C itself. In addition, the layer in contact with the surface of the second optically anisotropic layer 14C on the third optically anisotropic layer 16C side is the adhesion layer 22. Therefore, in FIG. 9, the Requirement 2 is satisfied in a case where at least one of the difference between the average refractive index of the second optically anisotropic layer 14C and the average refractive index of the first optically anisotropic layer 12C, or the difference between the average refractive index of the second optically anisotropic layer 14C and the average refractive index of the adhesion layer 22 is 0.10 or less.

The above difference is a value obtained by subtracting a smaller value from a larger value of the two average refractive indexes, and in a case where the two average refractive indexes are both the same value, the difference is zero.

FIG. 9 shows the aspect in which the second optically anisotmpic layer and the third optically anisotropic layer are laminated through an adhesion layer, but in a case where the second optically anisotropic layer and the third optically anisotropic layer are in direct contact with each other, the Requirement 2 is satisfied in a case where at least one of the difference between the average refractive index of the second optically anisotropic layer and the average refractive index of the first optically anisotropic layer, or the difference between the average refractive index of the second optically anisotropic layer and the average refractive index of the third optically anisotropic layer is 0.10 or less.

In addition, FIG. 9 shows the aspect in which the first optically anisotropic layer and the second optically anisotropic layer are in direct contact with each other, but in a case where the first optically anisotropic layer and the second optically anisotropic layer are laminated through an adhesion layer, and therefore the second optically anisotropic layer and the adhesion layer are in contact with each other, the Requirement 2 is satisfied in a case where at least one of the difference between the average refractive index of the second optically anisotropic layer and the average refractive index of the adhesion layer in contact with the surface of the second optically anisotropic layer on the first optically anisotropic layer side, or the difference between the average refractive index of the second optically anisotropic layer and the average refractive index of the adhesion layer in contact with the surface of the second optically anisotropic layer on the third optically anisotropic layer side is 0.10 or less.

Further, in a case where the first optically anisotropic layer and the second optically anisotropic layer are laminated through an adhesion layer and therefore the second optically anisotropic layer and the adhesion layer are in contact with each other, and the second optically anisotropic layer and the third optically anisotropic layer are in direct contact with each other, the Requirement 2 is satisfied in a case where at least one of the difference between the average refractive index of the second optically anisotropic layer and the average refractive index of the adhesion layer, or the difference between the average refractive index of the second optically anisotropic layer and the average refractive index of the third optically anisotropic layer is 0.10 or less.

The Requirement 3 specifies that at least one of the difference between the average refractive index of the third optically anisotropic layer and the average refractive index of the layer in contact with the surface of the third optically anisotropic layer on the second optically anisotropic layer side, or the difference between the average refractive index of the third optically anisotropic layer and the average refractive index of the layer in contact with the surface of the third optically anisotropic layer on the fourth optically anisotropic layer side is 0.10 or less. In FIG. 9, the layer in contact with the surface of the third optically anisotropic layer 16C on the second optically anisotropic layer 14C side is the adhesion layer 22. In addition, the layer in contact with the surface of the third optically anisotropic layer 16C on the fourth optically anisotropic layer 18C side is the fourth optically anisotropic layer 18C itself. Therefore, in FIG. 9, the Requirement 3 is satisfied in a case where at least one of the difference between the average refractive index of the third optically anisotropic layer 16C and the average refractive index of the adhesion layer 22, or the difference between the average refractive index of the third optically anisotropic layer 16C and the average refractive index of the fourth optically anisotropic layer 18C is 0.10 or less.

The above difference is a value obtained by subtracting a smaller value from a larger value of the two average refractive indexes, and in a case where the two average refractive indexes are both the same value, the difference is zero.

FIG. 9 shows the aspect in which the second optically anisotmpic layer and the third optically anisotropic layer are laminated through an adhesion layer, but in a case where the second optically anisotropic layer and the third optically anisotropic layer are in direct contact with each other, the Requirement 3 is satisfied in a case where at least one of the difference between the average refractive index of the third optically anisotropic layer and the average refractive index of the second optically anisotropic layer, or the difference between the average refractive index of the third optically anisotropic layer and the average refractive index of the fourth optically anisotropic layer is 0.10 or less.

In addition, FIG. 9 shows the aspect in which the third optically anisotropic layer and the fourth optically anisotropic layer are in direct contact with each other, but in a case where the third optically anisotropic layer and the fourth optically anisotropic layer are laminated through an adhesion layer, and therefore the third optically anisotropic layer and the adhesion layer are in contact with each other, the Requirement 3 is satisfied in a case where at least one of the difference between the average refractive index of the third optically anisotropic layer and the average refractive index of the adhesion layer in contact with the surface of the third optically anisotropic layer on the second optically anisotropic layer side, or the difference between the average refractive index of the third optically anisotropic layer and the average refractive index of the adhesion layer in contact with the surface of the third optically anisotropic layer on the fourth optically anisotropic layer side is 0.10 or less.

Further, in a case where the third optically anisotropic layer and the fourth optically anisotropic layer are laminated through an adhesion layer and therefore the third optically anisotropic layer and the adhesion layer are in contact with each other, and the third optically anisotropic layer and the second optically anisotropic layer are in direct contact with each other, the Requirement 3 is satisfied in a case where at least one of the difference between the average refractive index of the third optically anisotropic layer and the average refractive index of the adhesion layer, or the difference between the average refractive index of the third optically anisotropic layer and the average refractive index of the second optically anisotropic layer is 0.10 or less.

The Requirement 4 specifies that the difference between the average refractive index of the fourth optically anisotropic layer and the average refractive index of the layer in contact with the surface of the fourth optically anisotropic layer on the third optically anisotropic layer side is 0.10 or less. In FIG. 9, the layer in contact with the surface of the fourth optically anisotropic layer 18C on the third optically anisotropic layer 16C side is the third optically anisotropic layer 16C itself. Therefore, in FIG. 9, the Requirement 4 is satisfied in a case where the difference between the average refractive index of the fourth optically anisotropic layer 18C and the average refractive index of the third optically anisotropic layer 16C is 0.10 or less.

The above difference is a value obtained by subtracting a smaller value from a larger value of the two average refractive indexes, and in a case where the two average refractive indexes are both the same value, the difference is zero.

FIG. 9 shows the aspect in which the fourth optically anisotropic layer and the third optically anisotropic layer are in direct contact with each other, but in a case where the fourth optically anisotropic layer and the third optically anisotropic layer are laminated through an adhesion layer, and therefore the fourth optically anisotropic layer and the adhesion layer are in contact with each other, the Requirement 4 is satisfied in a case where the difference between the average refractive index of the fourth optically anisotropic layer and the average refractive index of the adhesion layer is 0.10 or less.

(Optically Anisotropic Layer)

In the third embodiment of the phase difference film, the first optically anisotropic layer 12C to the fourth optically anisotropic layer 18C are layers different from each other. The layers different from each other are, for example, layers with different types of liquid crystal compounds used for forming an optically anisotropic layer, layers with different alignment morphologies or alignment directions of the liquid crystal compounds in the optically anisotropic layer, and layers with different optical characteristics (for example, in-plane retardation and thickness direction retardation) of the optically anisotropic layer.

The first optically anisotropic layer 12C to the fourth optically anisotropic layer 18C are preferably layers formed by fixing an aligned liquid crystal compound, and more preferably layers formed by fixing a liquid crystal compound having a polymerizable group by polymerization.

The type of the liquid crystal compound is not particularly limited, and the liquid crystal compound can be generally classified into a rod-like liquid crystal compound and a disk-like liquid crystal compound according to its shape.

The liquid crystal compound preferably has a polymerizable group. That is, the liquid crystal compound is preferably a polymerizable liquid crystal compound. Examples of the polymerizable group contained in the polymerizable liquid crystal compound include an acryloyl group, a methacryloyl group, an epoxy group, and a vinyl group.

Examples of the alignment state that the liquid crystal compound can take include homogenous alignment, homeotropic alignment, hybrid alignment, twisted alignment, and tilt alignment. The twisted alignment represents an alignment state in which a liquid crystal compound is twisted from one main surface to the other main surface of an optically anisotropic layer with the thickness direction of the optically anisotropic layer as a rotation axis. In the twisted alignment, the twisted angle of the liquid crystal compound (twisted angle of the liquid crystal compound in an alignment direction) is usually more than 0° and 360° or less in many cases.

At least one of the first optically anisotropic layer 12C to the fourth optically anisotropic layer 18C may be the above-mentioned A-plate, a negative A-plate, or a positive A-plate.

In addition, at least one of the first optically anisotropic layer 12C to the fourth optically anisotropic layer 18C may be the above-mentioned C-plate, a negative C-plate, or a positive C-plate.

In addition, at least one of the first optically anisotropic layer 12C to the fourth optically anisotropic layer 18C may be a layer formed by fixing a liquid crystal compound twist-aligned (a layer formed by fixing a liquid crystal compound twist-aligned along a helical axis extending in a thickness direction).

The liquid crystal compound used for the layer formed by fixing a liquid crystal compound twist-aligned is preferably a rod-like liquid crystal compound.

The thickness of each layer of the first optically anisotropic layer 12C to the fourth optically anisotropic layer 18C is not particularly limited, and is preferably 10 μm or less, more preferably 0.1 to 5.0 μm, and still more preferably 0.3 to 3.0 μm.

The thickness of each layer of the first optically anisotropic layer 12C to the fourth optically anisotropic layer 18C is intended to refer to an average thickness of each layer. The average thickness is obtained by measuring the thicknesses of any five or more points of each layer and arithmetically averaging the measured values.

One suitable aspect of the first optically anisotmpic layer 12C to the fourth optically anisotropic layer 18C may be, for example, an aspect in which the first optically anisotropic layer 12C is a negative C-plate, the second optically anisotropic layer 14C is a negative A-plate, the third optically anisotropic layer 16C is a layer formed by fixing a rod-like liquid crystal compound twist-aligned along a helical axis extending in a thickness direction, the fourth optically anisotropic layer 18C is a positive C-plate, and the angle formed by the in-plane slow axis of the second optically anisotmpic layer 14C and the in-plane slow axis of the third optically anisotropic layer 16C on the surface on the second optically anisotropic layer 14C side is within a range of 0° to 30°. This aspect (hereinafter, also simply referred to as "suitable aspect 1") corresponds to the aspect described in the first embodiment of the phase difference film described above, and the suitable aspect of each layer is the same as the suitable aspect of each layer described in the first embodiment.

In addition, another suitable aspect of the first optically anisotropic layer 12C to the fourth optically anisotropic layer 18C may be, for example, an aspect in which the first optically anisotropic layer 12C is a positive C-plate, the second optically anisotropic layer 14C is a positive A-plate, the third optically anisotropic layer 16C is a layer formed by fixing a disk-like liquid crystal compound twist-aligned along a helical axis extending in a thickness direction, the fourth optically anisotropic layer 18C is a negative C-plate, and the angle formed by the in-plane slow axis of the second optically anisotropic layer 14C and the in-plane slow axis of the third optically anisotropic layer 16C on the surface on the second optically anisotmpic layer 14C side is within a range of 0° to 30°. This aspect (hereinafter, also simply referred to as "suitable aspect 2") corresponds to the aspect described in the second embodiment of the phase difference film described above, and the suitable aspect of each layer is the same as the suitable aspect of each layer described in the second embodiment.

Adhesion Layer

Examples of the adhesion layer include the adhesion layer (pressure sensitive adhesive layer and adhesive layer) described in the first embodiment of the phase difference film described above.

More specifically, the adhesive layer is a layer formed by using an adhesive. Examples of the adhesive include a water-based adhesive, a solvent-based adhesive, an emulsion-based adhesive, a solvent-free adhesive, an active energy ray curable adhesive, and a heat curable adhesive. Examples of the active energy ray curable adhesive include an electron beam curable adhesive, an ultraviolet curable adhesive, and a visible light curable adhesive, among which an ultraviolet curable adhesive is preferable. That is, the adhesion layer is preferably a layer formed by using an ultraviolet curable adhesive.

Specific examples of the active energy ray curable adhesive include a (meth)acrylate-based adhesive. Examples of the curable component in the (meth)acrylate-based adhesive include a compound having a (meth)acryloyl group and a compound having a vinyl group.

The thickness of the adhesive layer is not particularly limited, and is preferably 0.1 to 5 μm and more preferably 0.5 to 2 μm.

The pressure sensitive adhesive layer is a layer formed by using a pressure sensitive adhesive. Examples of the pressure sensitive adhesive include a rubber-based pressure sensitive adhesive, an acrylic pressure sensitive adhesive, a silicone-based pressure sensitive adhesive, an urethane-based pressure sensitive adhesive, a vinyl alkyl ether-based pressure sensitive adhesive, a polyvinyl alcohol-based pressure sensitive adhesive, a polyvinyl pyrrolidone-based pressure sensitive adhesive, a polyacrylamide-based pressure sensitive adhesive, and a cellulose-based pressure sensitive adhesive, among which an acrylic pressure sensitive adhesive (pressure sensitive adhesive) is preferable.

The acrylic pressure sensitive adhesive is preferably a copolymer of a (meth)acrylate in which the alkyl group of the ester portion is an alkyl group having 20 or less carbon atoms such as a methyl group, an ethyl group, or a butyl group with a (meth)acrylic monomer having a functional group such as (meth)acrylic acid or hydroxyethyl (meth) acrylate.

The thickness of the pressure sensitive adhesive layer is not particularly limited, and is preferably 1 to 30 μm and more preferably 5 to 20 μm.

The methods for producing the first optically anisotropic layer 12C to the fourth optically anisotropic layer 18C are not particularly limited, and the above-mentioned methods for producing the first optically anisotropic layer 12A to the fourth optically anisotropic layer 18A can be mentioned.

More specifically, in order to form a state in which two optically anisotropic layers are in direct contact with each other, for example, a composition for forming an optically anisotropic layer containing a liquid crystal compound having a polymerizable group (preferably, containing a material that imparts an alignment control ability to the surface of the optically anisotropic layer (for example, a photo alignment polymer) in the composition for forming an optically anisotropic layer) onto a substrate to form an optically anisotropic layer, and then a composition for forming an optically anisotropic layer containing a liquid crystal compound having a polymerizable group is further applied onto the formed optically anisotropic layer to form a separate optically anisotropic layer, whereby it is possible to form a state in which the two optically anisotropic layers are in direct contact with each other.

In addition, in order to form a state in which the two optically anisotropic layers are arranged through an adhesion layer, for example, two separately prepared optically anisotropic layers can be bonded through the adhesion layer to form the above state.

As described above, the phase difference film according to the embodiment of the present invention can be formed by using a method of applying using a composition for forming an optically anisotropic layer containing a liquid crystal compound having a polymerizable group and a bonding method in combination.

The above-mentioned third embodiment of the phase difference film can be used as a circularly polarizing plate in combination with a polarizer in the same manner as the above-mentioned first embodiment and second embodiment of the phase difference film.

In a case where the third embodiment of the phase difference film is the above-mentioned suitable aspect 1, it is preferable to combine the third embodiment of the phase difference film and the polarizer such that the layer arrangement is the same as that of the above-mentioned first embodiment of the circularly polarizing plate.

In addition, in a case where the third embodiment of the phase difference film is the above-mentioned suitable aspect 2, it is preferable to combine the third embodiment of the phase difference film and the polarizer such that the layer arrangement is the same as that of the above-mentioned second embodiment of the circularly polarizing plate.

In a case where the third embodiment of the phase difference film and the polarizer are combined, the phase difference film and the polarizer may be laminated through the above-mentioned adhesion layer.

In a case where the third embodiment of the phase difference film and the polarizer are laminated through the adhesion layer, the difference between the average refractive index of the optically anisotropic layer in the phase difference film adjacent to the adhesion layer and the average refractive index of the adhesion layer is preferably 0.10 or less.

Fourth Embodiment of Phase Difference Film

Figure 10:
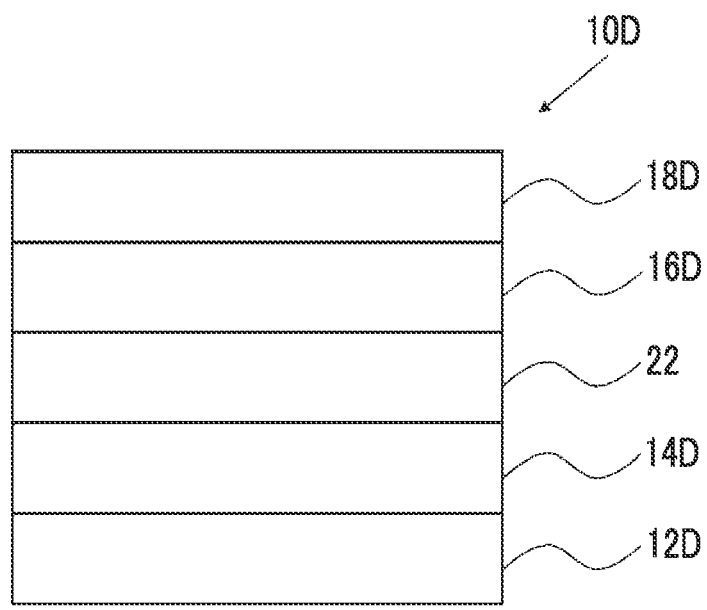
FIG. 10 is an example of a schematic cross-sectional view of a fourth embodiment of the phase difference film of the present invention.

Hereinafter, the fourth embodiment of the phase difference film according to the embodiment of the present invention will be described with reference to the accompanying drawings. FIG. 10 shows a schematic cross-sectional view of the fourth embodiment of the phase difference film according to the embodiment of the present invention.

A phase difference film 10D has a first optically anisotropic layer 12D, a second optically anisotropic layer 14D, a third optically anisotropic layer 16D, and a fourth optically anisotropic layer 18D in this order. The second optically anisotropic layer 14D and the third optically anisotropic layer 16D are laminated through an adhesion layer 22. The adhesion layer 22 is in contact with the second optically anisotropic layer 14D and the third optically anisotropic layer 16D.

In FIG. 10, the second optically anisotropic layer 14D and the third optically anisotropic layer 16D are laminated through the adhesion layer 22, but the present invention is not limited to this aspect. At least one pair of the first optically anisotropic layer and the second optically anisotropic layer, the second optically anisotropic layer and the third optically anisotropic layer, or the third optically anisotropic layer and the fourth optically anisotropic layer may be laminated through the adhesion layer.

The following Requirement 5 is satisfied in the fourth embodiment of the phase difference film according to the embodiment of the present invention.

Requirement 5: The difference between the average refractive index of the adhesion layer and the average refractive index of the optically anisotropic layer adjacent to the adhesion layer is 0.10 or less.

Hereinafter, the above point will be described by taking the phase difference film of FIG. 10 as an example.

In FIG. 10, the second optically anisotropic layer 14D and the third optically anisotropic layer 16D are laminated through the adhesion layer 22. In this embodiment, the adhesion layer and the second optically anisotropic layer 14D and the third optically anisotropic layer 16D are adjacent to each other. Therefore, the difference between the average refractive index of the adhesion layer and the average refractive index of the second optically anisotropic layer 14D is 0.10 or less, and the difference between the average refractive index of the adhesion layer and the average refractive index of the third optically anisotropic layer 16D is 0.10 or less.

In a case where the first optically anisotropic layer 12D and the second optically anisotropic layer 14D are laminated through the adhesion layer 22, and therefore the two optically anisotropic layers (first optically anisotropic layer 12D and the second optically anisotropic layer 14D) and the adhesion layer 22 are in contact with each other, the Requirement 5 is satisfied in a case where the difference between the average refractive index of the adhesion layer and the average refractive index of the first optically anisotropic layer 12D is 0.10 or less, and the difference between the average refractive index of the adhesion layer and the average refractive index of the second optically anisotropic layer 14D is 0.10 or less.

In addition, in a case where the third optically anisotropic layer 16D and the fourth optically anisotropic layer 18D are laminated through the adhesion layer 22, and therefore the two optically anisotropic layers (the third optically anisotropic layer 16D and the fourth optically anisotropic layer 18D) and the adhesion layer 22 are in contact with each other, the Requirement 5 is satisfied in a case where the difference between the average refractive index of the adhesion layer and the average refractive index of the third optically anisotropic layer 16D is 0.10 or less, and the difference between the average refractive index of the adhesion layer and the average refractive index of the fourth optically anisotropic layer 18D is 0.10 or less.

Above all, one suitable aspect of the fourth embodiment of the phase difference film may be, for example, an aspect in which the second optically anisotropic layer and the third optically anisotropic layer are laminated through the adhesion layer, the difference between the average refractive index of the adhesion layer and the average refractive index of the second optically anisotropic layer is 0.08 or less, and the difference between the average refractive index of the adhesion layer and the average refractive index of the third optically anisotropic layer is 0.08 or less.

In addition, another suitable aspect of the fourth embodiment of the phase difference film may be, for example, an aspect that satisfies all of the Requirements 1 to 4 described in the third embodiment of the phase difference film.

Optically Anisotropic Layer

In the fourth embodiment of the phase difference film, the first optically anisotropic layer 12D to the fourth optically anisotropic layer 18D are layers different from each other. The layers different from each other are, for example, layers with different types of liquid crystal compounds used for forming an optically anisotropic layer, layers with different alignment morphologies or alignment directions of the liquid crystal compounds in the optically anisotropic layer, and layers with different optical characteristics (for example, in-plane retardation and thickness direction retardation) of the optically anisotropic layer.

The first optically anisotropic layer 12D to the fourth optically anisotropic layer 18D are preferably layers formed by fixing an aligned liquid crystal compound, and more preferably layers formed by fixing a liquid crystal compound having a polymerizable group by polymerization.

The type of the liquid crystal compound is not particularly limited, and the liquid crystal compound can be generally classified into a rod-like liquid crystal compound and a disk-like liquid crystal compound according to its shape.

The liquid crystal compound preferably has a polymerizable group. That is, the liquid crystal compound is preferably a polymerizable liquid crystal compound. Examples of the polymerizable group contained in the polymerizable liquid crystal compound include an acryloyl group, a methacryloyl group, an epoxy group, and a vinyl group.

Examples of the alignment state that the liquid crystal compound can take include homogenous alignment, homeotropic alignment, hybrid alignment, twisted alignment, and tilt alignment. The twisted alignment represents an alignment state in which a liquid crystal compound is twisted from one main surface to the other main surface of an optically anisotropic layer with the thickness direction of the optically anisotropic layer as a rotation axis. In the twisted alignment, the twisted angle of the liquid crystal compound (twisted angle of the liquid crystal compound in an alignment direction) is usually more than 0° and 360° or less in many cases.

At least one of the first optically anisotropic layer 12D to the fourth optically anisotropic layer 18D may be the above-mentioned A-plate, a negative A-plate, or a positive A-plate.

In addition, at least one of the first optically anisotropic layer 12D to the fourth optically anisotropic layer 18D may be the above-mentioned C-plate, a negative C-plate, or a positive C-plate.

In addition, at least one of the first optically anisotropic layer 12D to the fourth optically anisotropic layer 18D may be a layer formed by fixing a liquid crystal compound twist-aligned (a layer formed by fixing a liquid crystal compound twist-aligned along a helical axis extending in a thickness direction).

The liquid crystal compound used for the layer formed by fixing a liquid crystal compound twist-aligned is preferably a rod-like liquid crystal compound.

The thickness of each layer of the first optically anisotropic layer 12D to the fourth optically anisotropic layer 18D is not particularly limited, and is preferably 10 μm or less, more preferably 0.1 to 5.0 μm, and still more preferably 0.3 to 3.0 μm.

The thickness of each layer of the first optically anisotropic layer 12D to the fourth optically anisotropic layer 18D is intended to refer to an average thickness of each layer. The average thickness is obtained by measuring the thicknesses of any five or more points of each layer and arithmetically averaging the measured values.

One suitable aspect of the first optically anisotropic layer 12D to the fourth optically anisotropic layer 18D may be, for example, an aspect in which the first optically anisotropic layer 12D is a negative C-plate, the second optically anisotropic layer 14D is a negative A-plate, the third optically anisotropic layer 16D is a layer formed by fixing a rod-like liquid crystal compound twist-aligned along a helical axis extending in a thickness direction, the fourth optically anisotropic layer 18D is a positive C-plate, and the angle formed by the in-plane slow axis of the second optically anisotropic layer 14D and the in-plane slow axis of the third optically anisotropic layer 16D on the surface on the second optically anisotropic layer 14D side is within a range of 0° to 30°. This aspect (hereinafter, also simply referred to as "suitable aspect 3") corresponds to the aspect described in the first embodiment of the phase difference film described above, and the suitable aspect of each layer is the same as the suitable aspect of each layer described in the first embodiment.

In addition, another suitable aspect of the first optically anisotropic layer 12D to the fourth optically anisotropic layer 18D may be, for example, an aspect in which the first optically anisotropic layer 12D is a positive C-plate, the second optically anisotropic layer 14D is a positive A-plate, the third optically anisotropic layer 16D is a layer formed by fixing a disk-like liquid crystal compound twist-aligned along a helical axis extending in a thickness direction, the fourth optically anisotropic layer 18D is a negative C-plate, and the angle formed by the in-plane slow axis of the second optically anisotropic layer 14D and the in-plane slow axis of the third optically anisotropic layer 16D on the surface on the second optically anisotropic layer 14D side is within a range of 0° to 30°. This aspect (hereinafter, also simply referred to as "suitable aspect 4") corresponds to the aspect described in the second embodiment of the phase difference film described above, and the suitable aspect of each layer is the same as the suitable aspect of each layer described in the second embodiment.

Adhesion Layer

Examples of the adhesion layer include the adhesion layer (pressure sensitive adhesive layer and adhesive layer) described in the third embodiment of the phase difference film described above.

The methods for producing the first optically anisotropic layer 12D to the fourth optically anisotropic layer 18D are not particularly limited, and the above-mentioned methods for producing the first optically anisotropic layer 12C to the fourth optically anisotropic layer 18C can be mentioned.

The above-mentioned fourth embodiment of the phase difference film can be used as a circularly polarizing plate in combination with a polarizes in the same manner as the above-mentioned first embodiment and second embodiment of the phase difference film.

In a case where the fourth embodiment of the phase difference film is the above-mentioned suitable aspect 3, it is preferable to combine the fourth embodiment of the phase difference film and the polarizer such that the layer arrangement is the same as that of the above-mentioned first embodiment of the circularly polarizing plate.

In addition, in a case where the fourth embodiment of the phase difference film is the above-mentioned suitable aspect 4, it is preferable to combine the fourth embodiment of the phase difference film and the polarizer such that the layer arrangement is the same as that of the above-mentioned second embodiment of the circularly polarizing plate.

In a case where the fourth embodiment of the phase difference film and the polarizer are combined, the phase difference film and the polarizer may be laminated through the above-mentioned adhesion layer.

In a case where the fourth embodiment of the phase difference film and the polarizer are laminated through the adhesion layer, the difference between the average refractive index of the optically anisotropic layer in the phase difference film adjacent to the adhesion layer and the average refractive index of the adhesion layer is preferably 0.10 or less.

Applications

The above-mentioned phase difference film can be applied to various applications and can be used, for example, as a so-called λ/4 plate or λ/2 plate by adjusting the optical characteristics of each optically anisotropic layer.

The λ/4 plate is a plate having a function of converting linearly polarized light having a specific wavelength into circularly polarized light (or circularly polarized light into linearly polarized light). More specifically, the λ/4 plate is a plate in which the in-plane retardation Re at a predetermined wavelength of λ nm is λ/4 (or an odd multiple thereof).

The in-plane retardation (Re(550)) of the λ/4 plate at a wavelength of 550 nm may have an error of about 25 nm centered on an ideal value (137.5 nm), and is, for example, preferably 110 to 160 nm and more preferably 120 to 150 nm.

In addition, the λ/2 plate refers to an optically anisotropic film in which the in-plane retardation Re(λ) at a specific wavelength of λ nm satisfies Re(λ)≈λ/2. This expression may be achieved at any wavelength (for example, 550 nm) in the visible light region. Above all, it is preferable that the in-plane retardation Re(550) at a wavelength of 550 nm satisfies the following relationship.

210 nm≤Re(550)≤300 nm

Display Device

The phase difference film (first embodiment to fourth embodiment) and circularly polarizing plate (first embodiment and second embodiment) according to the embodiment of the present invention can be suitably applied to a display device.

The display device according to the embodiment of the present invention has a display element and the above-mentioned phase difference film or circularly polarizing plate.

It is preferable that the display device according to the embodiment of the present invention further has a surface protective film including a hard coat layer, in addition to the display element and the above-mentioned phase difference film or circularly polarizing plate.

In a case where the phase difference film according to the embodiment of the present invention is applied to a display device, it is preferably applied as the above-mentioned circularly polarizing plate. In this case, the circularly polarizing plate is arranged on the viewing side, and the polarizer is arranged on the viewing side in the circularly polarizing plate. In a case where the display device further has a surface protective film, the surface protective film is arranged further on the viewing side than the polarizer. That is, the surface protective film, the polarizer, the phase difference film, and the display element are arranged in this order from the viewing side.

The display element is not particularly limited, and examples thereof include an organic electroluminescence display element and a liquid crystal display element.

Other Configurations

The adhesion layer, the substrate, and the hard coat layer of the surface protective film used on the viewing side of the display element of the display device according to the embodiment of the present invention may contain an ultraviolet absorber from the viewpoint of improving the light resistance of the display element. The ultraviolet absorber is not particularly limited, and various known ultraviolet absorbers can be used. For example, the ultraviolet absorber described in WO2021/006097A can be used.

The light transmittance of the laminate on the viewing side of the display element is preferably 1% or less at a wavelength of 380 nm, 20% to 70% at a wavelength of 410 nm, and 90% or more in a wavelength range of 450 nm or more.

The light transmittance at a wavelength of 410 nm is more preferably 40% to 50%.

EXAMPLES

Hereinafter, features of the present invention will be described more specifically with reference to Examples and Comparative Examples. The materials, amounts used, proportions, treatment details, and treatment procedure shown in the following Examples can be appropriately changed without departing from the spirit and scope of the present invention. Accordingly, the scope of the present invention should not be construed as being limited by the specific examples given below.

Example 1

Preparation of Cellulose Acylate Film

The following composition was put into a mixing tank, stirred, and further heated at 90° C. for 10 minutes. Then, the obtained composition was filtered through a filter paper having an average pore diameter of 34 μm and a sintered metal filter having an average pore diameter of 10 μm to prepare a dope. The concentration of solid contents of the dope is 23.5% by mass, and the solvent of the dope is methylene chloride/methanol/butanol=81/18/1 (mass ratio).

Cellulose Acylate Dope
Cellulose acylate 100 parts by mass
(acetyl substitution degree: 2.86, viscosity average degree of polymerization: 310)
Sugar ester compound 1 (represented by Formula (S4)) 6.0 parts by mass
Sugar ester compound 2 (represented by Formula (S5)) 2.0 parts by mass
Silica particle dispersion 0.1 parts by mass
(AEROSIL R972, manufactured by Nippon Aerosil Co., Ltd.)
Solvent (methylene chloride/methanol/butanol)

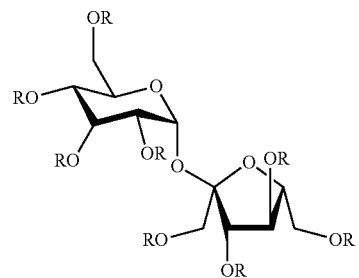

(S4)

(R=benzoyl or H
Average substitution degree: 5.7)

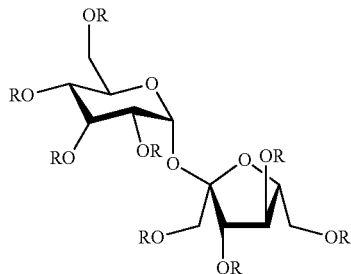

(S5)

(R=acetyllisabutyryl=26)

The dope prepared above was cast using a drum film forming machine. The dope was cast from a die such that it was in contact with a metal support cooled to 0° C., and then the obtained web (film) was stripped off. The drum was made of SUS.

The web (film) obtained by casting was peeled off from the drum and then dried in a tenter device for 20 minutes at 30° C. to 40° C. during film transport, using the tenter device that clips both ends of the web with clips to transport the film. Subsequently, the web was post-dried by zone heating while being rolled. The obtained web was knurled and then wound up.

The obtained cellulose acylate film had a film thickness of 40 μm, an in-plane retardation of 1 nm at a wavelength of 550 nm, and a thickness direction retardation of 26 nm at a wavelength of 550 nm.

In this manner, an optically anisotropic layer (1a) consisting of a cellulose acylate film corresponding to the first optically anisotropic layer was prepared.

After passing the above-mentioned cellulose acylate film through a dielectric heating roll at a temperature of 60° C. to raise the film surface temperature to 40° C., an alkaline solution having the composition shown below was applied onto a band surface of the film using a bar coater at a coating amount of 14 ml/m², followed by heating to 110° C., and transportation under a steam type far-infrared heater manufactured by Noritake Company Limited for 10 seconds. Subsequently, pure water was applied at 3 ml/m² using the same bar coater. Then, after repeating washing with water with a fountain coater and draining with an air knife three times, the film was transported to a drying zone at 70° C. for 10 seconds and dried to prepare a cellulose acylate film subjected to an alkali saponification treatment.

Alkaline Solution
Potassium hydroxide 4.7 parts by mass
Water 15.8 parts by mass
Isopropanol 63.7 parts by mass
Surfactant: $C_{14}H_{29}O(CH_2CH_2O)_{20}H$ 1.0 parts by mass
Propylene glycol 14.8 parts by mass Formation of Alignment Film An alignment film coating liquid 1 having the following composition was continuously applied onto the surface of the cellulose acylate film that had been subjected to the alkali saponification treatment with a #14 wire bar. Then, the obtained coating film was dried with hot air at 60° C. for 60 seconds and further with hot air at 100° C. for 120 seconds to obtain an alignment film 1.

Alignment Film Coating Liquid 1
Modified polyvinyl alcohol given below 28 parts by mass
Citric acid ester 1.2 parts by mass
(AS3, manufactured by Sankyo Chemical Co., Ltd.)
Photopolymerization initiator 0.84 parts by mass
(Irgacure 2959, manufactured by BASF SE)
Glutaraldehyde 2.8 parts by mass
Water 699 parts by mass
Methanol 226 parts by mass Modified Polyvinyl Alcohol

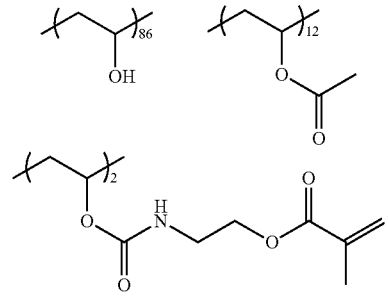

Formation of Optically Anisotropic Layer (1b)

The alignment film 1 prepared above was continuously subjected to a rubbing treatment. At this time, the longitudinal direction and the transport direction of the elongated film (cellulose acylate film) were parallel, and the angle formed by the film longitudinal direction (transport direction) and the rubbing roller rotation axis was 76°. In a case where the film longitudinal direction (transport direction) is 90° and the clockwise direction is represented by a positive value with reference to a film width direction (0°) upon observation from the film side, the rotation axis of the rubbing roller is at −14°. In other words, the position of the rotation axis of the rubbing roller upon observation from the film side is a position rotated by 76° clockwise with reference to the longitudinal direction of the film.

A composition (1b) for forming an optically anisotropic layer containing a disk-like liquid crystal compound having the following composition was applied onto the rubbing-treated alignment film using a Geeser coating machine to form a composition layer. Then, the obtained composition layer was heated with hot air at 110° C. for 2 minutes for drying of the solvent and alignment aging of the disk-like liquid crystal compound. Subsequently, the obtained composition layer was irradiated with UV (500 mJ/cm²) at 80° C. to immobilize the alignment of the disk-like liquid crystal compound to form an optically anisotropic layer (1b) corresponding to the second optically anisotropic layer.

The thickness of the optically anisotropic layer (1b) was 1.1 μm. The retardation at a wavelength of 550 nm was 168 nm. It was confirmed that the average tilt angle of the disc plane of the disk-like liquid crystal compound with respect to the film surface was 90°, and the disk-like liquid crystal compound was aligned perpendicular to the film surface. In addition, assuming that the angle of the in-plane slow axis of the optically anisotropic layer (1b) is parallel to the rotation axis of the rubbing roller, and the width direction of the film is 0° (the counterclockwise direction is 90° and the clockwise direction is −90° in a longitudinal direction), the in-plane slow axis direction of the optically anisotropic layer (1b) was −14° in a case of viewing from the optically anisotropic layer (1b) side.

Composition (1b) for Forming Optically Anisotropic Layer
Disk-like liquid crystal compound 1 given below 80 parts by mass
Disk-like liquid crystal compound 2 given below 20 parts by mass
Alignment film interface alignment agent 1 given below 0.55 parts by mass
Fluorine-containing compound A given below 0.1 parts by mass
Fluorine-containing compound B given below 0.05 parts by mass
Fluorine-containing compound C given below 0.21 parts by mass
Ethylene oxide-modified trimethylolpropane triacrylate 10 parts by mass
(V #360, manufactured by Osaka Organic Chemical Industry Ltd.)
Photopolymerization initiator 3.0 parts by mass
(Irgacure 907, manufactured by BASF SE)
Methyl ethyl ketone 200 parts by mass Disk-like liquid crystal compound 1

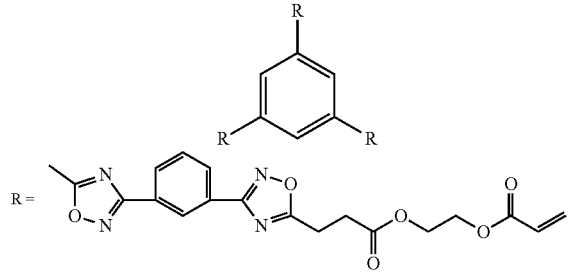

Disk-like liquid crystal compound 2

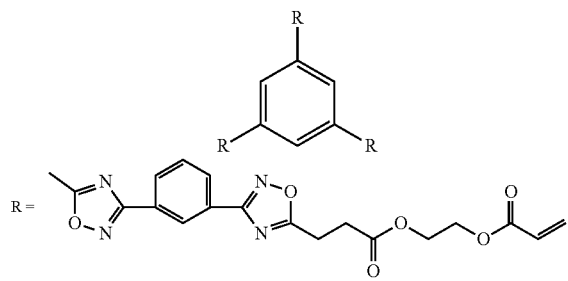

Alignment film interface alignment agent 1

Fluorine-containing compound A (in the following formula, a and b represent the content (% by mass) of each repeating unit with respect to all the repeating units, a represents 90% by mass, and b represents 10% by mass)

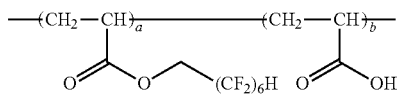

Fluorine-containing compound B (The numerical value in each repeating unit represents the content (% by mass) with respect to all the repeating units, the content of the repeating unit on the left side was 32.5% by mass, and the content of the repeating unit on the right side was 67.5% by mass.)

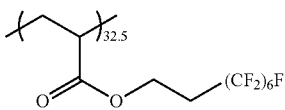

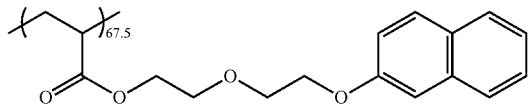

Fluorine-containing compound C (The numerical value in each repeating unit represents the content (% by mass) with respect to all the repeating units, the content of the repeating unit on the left side was 25% by mass, the content of the repeating unit in the middle was 25% by mass, and the content of the repeating unit on the right side was 50% by mass)

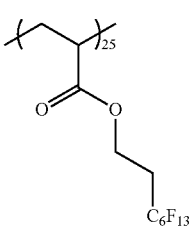 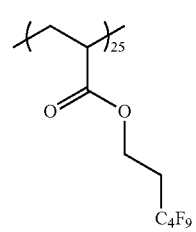

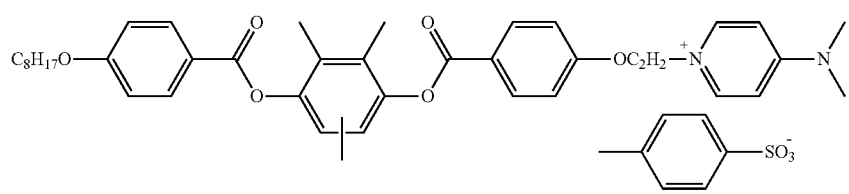

-continued

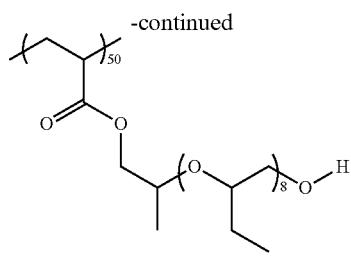

A laminate (1a-1b) in which the optically anisotropic layer (1a) and the optically anisotropic layer (1b) were laminated was prepared by the above procedure.

(Formation of Optically Anisotropic Layer (1d))

A composition (1d) for forming an optically anisotropic layer containing a rod-like liquid crystal compound having the following composition was applied onto the cellulose acylate film prepared above using a Geeser coating machine to form a composition layer. After that, both ends of the film were held, a cooling plate (9° C.) was installed on the side of the surface on which the coating film of the film was formed so that the distance from the film was 5 mm, and a heater (75° C.) was installed on the side opposite to the surface on which the coating film of the film was formed so that the distance from the film was 5 mm, followed by drying for 2 minutes.

Next, the obtained film was heated with hot air at 60° C. for 1 minute, and irradiated with ultraviolet rays having an irradiation amount of 100 mJ/cm$^2$ using a 365 nm UV-LED while purging with nitrogen so as to have an atmosphere having an oxygen concentration of 100 ppm by volume or less. Then, the obtained coating film was annealed with hot air at 120° C. for 1 minute to form an optically anisotropic layer (1d) corresponding to the fourth optically anisotropic layer.

The obtained optically anisotropic layer (1d) was irradiated with UV light (ultra-high pressure mercury lamp; UL750, manufactured by HOYA Corporation) passing through a wire grid polarizer at room temperature at 7.9 mJ/cm$^2$ (wavelength: 313 nm) to form a composition layer having an alignment control ability on the surface.

The film thickness of the formed optically anisotropic layer (1d) was 0.6 μm. The in-plane retardation Re at a wavelength of 550 nm was 0 nm, and the thickness direction retardation Rth at a wavelength of 550 nm was −75 nm. It was confirmed that the average tilt angle of the major axis direction of the rod-like liquid crystal compound with respect to the film surface was 90°, and the rod-like liquid crystal compound was aligned perpendicular to the film surface.

Composition (1d) for Forming Optically Anisotropic Layer
Rod-like liquid crystal compound (A) given below 100 parts by mass
Polymerizable monomer 4.0 parts by mass
(A-400, manufactured by Shin-Nakamura Chemical Co., Ltd.)
Polymerization initiator S-1 (oxime type) given below 5.0 parts by mass
Photoacid generator D-1 given below 3.0 parts by mass
Polymer M-1 given below 2.0 parts by mass
Vertical alignment agent S01 given below 2.0 parts by mass
Photo-alignable polymer A-1 given below 2.0 parts by mass
Surfactant B-1 given below 0.2 parts by mass
Methyl ethyl ketone 42.3 parts by mass
Methyl isobutyl ketone 627.5 parts by mass Rod-Like Liquid Crystal Compound (A) (Hereinafter, a Mixture of Compounds)

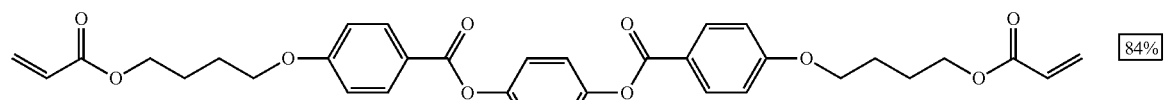

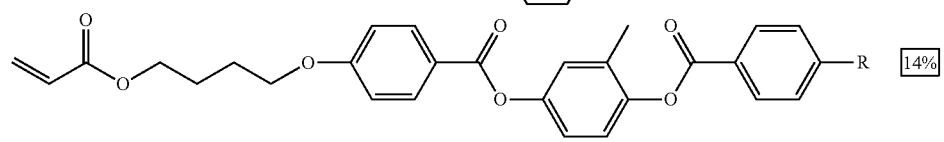

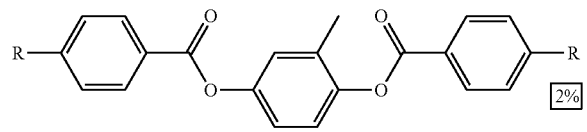

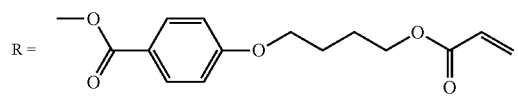

Polymerization Initiator S-1

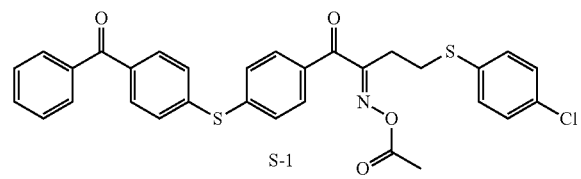

Photoacid Generator D-1
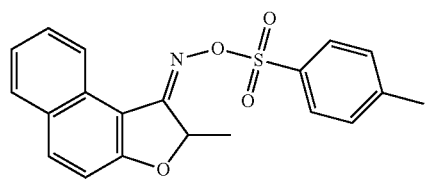 [SMILES: Cc1ccc(S(=O)(=O)O/N=C2/c3c(ccc4ccccc34)OC2C)cc1]
Polymer M-1
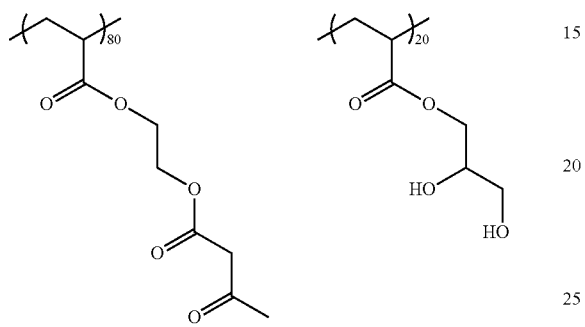
Vertical Alignment Agent S01
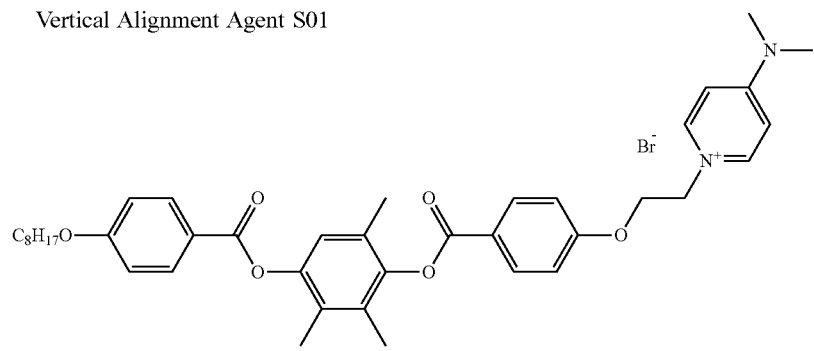
Photo-alignable polymer A-1 (The numerical value described in each repeating unit represents the content (% by mass) of each repeating unit with respect to all the repeating units, which was 43% by mass, 27% by mass, and 30% by mass from the left repeating unit. In addition, the weight-average molecular weight was 69,800.)
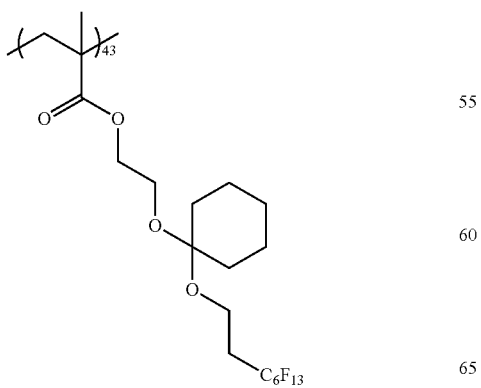

-continued

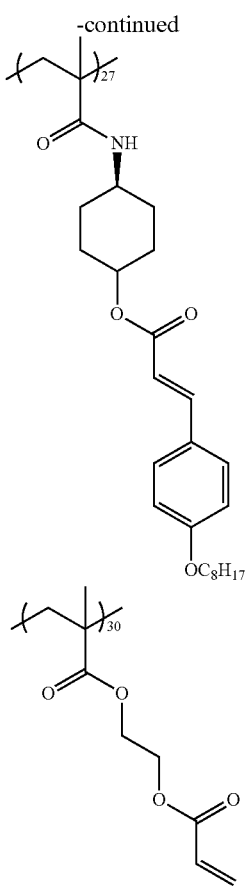

Surfactant B-1 (Weight-Average Molecular Weight was 2,200)

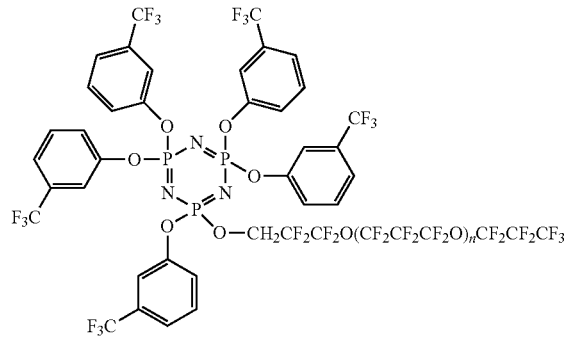

Formation of Optically Anisotropic Layer (1c)

Next, a composition (1c) for forming an optically anisotropic layer containing a rod-like liquid crystal compound having the following composition was applied onto the optically anisotropic layer (1d) prepared above by using a Geeser coating machine, and heated with hot air at 80° C. for 60 seconds. Subsequently, the obtained composition layer was irradiated with UV (500 mJ/cm²) at 80° C. to immobilize the alignment of the liquid crystal compound to form an optically anisotropic layer (1c) corresponding to the third optically anisotropic layer.

The optically anisotropic layer (1c) had a thickness of 1.2 μm, Δnd of 164 nm at a wavelength of 550 nm, and a twisted angle of a liquid crystal compound of 81°. Assuming that the width direction of the film is defined as 0° (the longitudinal direction of the film is defined as 90°), the in-plane slow axis direction (alignment axis angle of the liquid crystal compound) was 14° on the air side and 95° on the side in contact with the optically anisotropic layer (1d), in a case of viewing from the optically anisotropic layer (1c) side.

The in-plane slow axis direction of the optically anisotropic layer is expressed as negative in a case where it is clockwise (right-handed turning) and positive in a case where it is counterclockwise (left-handed turning) with the width direction of the substrate as a reference of 0°, upon observing the substrate from the surface side of the optically anisotropic layer.

Composition (1c) for Forming Optically Anisotropic Layer

Rod-like liquid crystal compound (A) given above 100 parts by mass

Ethylene oxide-modified trimethylolpropane triacrylate 4 parts by mass (V #360, manufactured by Osaka Organic Chemical Industry Ltd.)

Photopolymerization initiator 3 parts by mass (Irgacure 819, manufactured by BASF SE)

Left-handed twisting chiral agent (L1) given below 0.60 parts by mass

Fluorine-containing compound C given above 0.08 parts by mass

Methyl ethyl ketone 156 parts by mass

Left-Handed Twisting Chiral Agent (L1) (Bu Represents a Butyl Group)

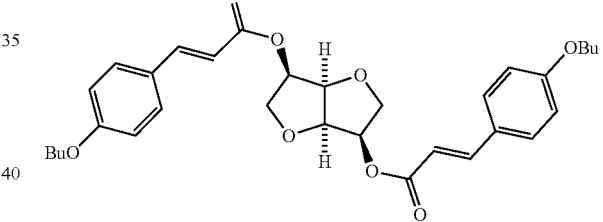

A laminate (1c-1d) in which the optically anisotropic layer (1d) and the optically anisotropic layer (1c) were directly laminated on an elongated cellulose acylate film was prepared by the above procedure. The difference in the refractive index between the average refractive index of the optically anisotropic layer (1c) and the average refractive index of the optically anisotropic layer (1d) was within 0.05.

The surface side of the optically anisotropic layer (1b) formed on the optically anisotropic layer (1a) consisting of the above prepared elongated cellulose acylate film, and the surface side of the optically anisotropic layer (1c) of the laminate (1c-1d) formed on the above prepared elongated cellulose acylate film were continuously bonded to each other using an ultraviolet curable adhesive such that the angle formed by the in-plane slow axis of the optically anisotropic layer (1b) and the in-plane slow axis on the surface side of the optically anisotropic layer (1c) is 0°.

An adhesive with high-refractive monomer added to acrylic compound to control the refractive index after curing to 1.58 was used as the ultraviolet curable adhesive. The difference in the refractive index between the average refractive index of the optically anisotropic layer adjacent to the adhesive layer and the average refractive index of the adhesive layer was within 0.05.

Subsequently, the cellulose acylate film on the optically anisotropic layer (1d) side was peeled off to expose the surface of the optically anisotropic layer (1d) in contact with the cellulose acylate film. In this manner, an optical film (1a-1b-1c-1d) in which the optically anisotropic layer (1b), the optically anisotropic layer (1c), and the optically anisotropic layer (1d) were laminated in this order on the optically anisotropic layer (1a) consisting of an elongated cellulose acylate film was obtained.

Preparation of Linearly Polarizing Plate

The surface of a support of a cellulose triacetate film TJ25 (manufactured by Fujifilm Corporation, thickness: 25 μm) was subjected to an alkali saponification treatment. Specifically, the support was immersed in a 1.5 N sodium hydroxide aqueous solution at 55° C. for 2 minutes, washed in a water bath at room temperature, and further neutralized with 0.1 N sulfuric acid at 30° C. After neutralization, the support was washed in a water bath at room temperature and further dried with hot air at 100° C. to obtain a polarizer protective film.

A roll-like polyvinyl alcohol (PVA) film having a thickness of 60 μm was continuously stretched in an aqueous iodine solution in a longitudinal direction and dried to obtain a polarizer having a thickness of 13 μm. The visibility corrected single transmittance of the polarizer was 43%. At this time, the absorption axis direction and the longitudinal direction of the polarizer were the same.

The polarizer protective film was bonded to one surface of the polarizer using the following PVA adhesive to prepare a linearly polarizing plate.

Preparation of PVA Adhesive 100 parts by mass of a polyvinyl alcohol-based resin having an acetoacetyl group (average degree of polymerization: 1200, degree of saponification: 98.5 mol %, degree of acetoacetylation: 5 mol %) and 20 parts by mass of methylol melamine were dissolved in pure water under a temperature condition of 30° C. to prepare a PVA adhesive as an aqueous solution adjusted to a concentration of solid contents of 3.7% by mass.

Preparation of Circularly Polarizing Plate

The surface of the optically anisotropic layer (1a) of the above prepared elongated optical film (1a-1b-1c-1d) and the surface of the polarizer (the surface opposite to the polarizer protective film) of the above prepared elongated linearly polarizing plate were continuously bonded to each other using an ultraviolet curable adhesive.

In this manner, a circularly polarizing plate (P1) consisting of the optical film (1a-1b-1c-1d) and the linearly polarizing plate was prepared. At this time, the polarizer protective film, the polarizer, the optically anisotropic layer (1a), the optically anisotropic layer (1b), the optically anisotropic layer (1c), and the optically anisotropic layer (1d) were laminated in this order, and the angle formed by the absorption axis of the polarizer and the in-plane slow axis of the optically anisotropic layer (1b) was 76°. In addition, the angle formed by the in-plane slow axis of the optically anisotropic layer (1b) and the in-plane slow axis of the optically anisotropic layer (1c) on the surface on the optically anisotropic layer (1b) side was 0°. The twisted angle of the liquid crystal compound of the optically anisotropic layer (1c) was 81°. The angle formed by the absorption axis of the polarizer and the in-plane slow axis of the optically anisotropic layer (1c) on the surface on the optically anisotropic layer (1d) side was 5°.

Example 2

An alignment film coating liquid 2 having the following composition was continuously applied onto the surface of an elongated cellulose acylate film prepared in the same manner as in Example 1 and subjected to the alkali saponification treatment with a #14 wire bar. The obtained coating film was dried with hot air at 60° C. for 60 seconds and further with hot air at 100° C. for 120 seconds to obtain an alignment film 2.

Alignment Film Coating Liquid 2
Polyvinyl alcohol given below 10 parts by mass
Water 371 parts by mass
Methanol 119 parts by mass
Glutaraldehyde (crosslinking agent) 0.5 parts by mass
Citric acid ester (manufactured by Sankyo Chemical Co., Ltd.) 0.175 parts by mass
Polyvinyl Alcohol

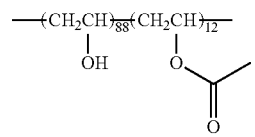

Formation of Optically Anisotropic Layer (2a)

A composition (2a) for forming an optically anisotropic layer containing a disk-like liquid crystal compound having the following composition was applied onto the alignment film 2 using a Geeser coating machine to form a composition layer. Then, the obtained composition layer was heated with hot air at 110° C. for 2 minutes for drying of the solvent and alignment aging of the disk-like liquid crystal compound. Subsequently, the obtained composition layer was irradiated with UV (500 mJ/cm$^2$) at 80° C. to immobilize the alignment of the liquid crystal compound to form an optically anisotropic layer (2a) corresponding to the first optically anisotropic layer.

The thickness of the optically anisotropic layer (2a) was 0.3 μm. In addition, the in-plane retardation at a wavelength of 550 nm was 0 nm, and the thickness direction retardation at a wavelength of 550 nm was 40 nm. It was confirmed that the average tilt angle of the disc plane of the disk-like liquid crystal compound with respect to the film surface was 0°, and the disk-like liquid crystal compound was horizontally aligned with respect to the film surface.

Composition (2a) for Forming Optically Anisotropic Layer
Disk-like liquid crystal compound 1 given above 80 parts by mass
Disk-like liquid crystal compound 2 given above 20 parts by mass
Fluorine-containing compound C given above 0.21 parts by mass
Polymer (A) given below 0.50 parts by mass
Ethylene oxide-modified trimethylolpropane triacrylate 10 parts by mass
(V #360, manufactured by Osaka Organic Chemical Industry Ltd.)
Photopolymerization initiator 3.0 parts by mass
(Irgacure 907, manufactured by BASF SE)
Methyl ethyl ketone 200 parts by mass
Polymer (A) (In the formulae, the numerical value described in each repeating unit represents the content (% by mass) of each repeating unit with respect to all the repeating units).

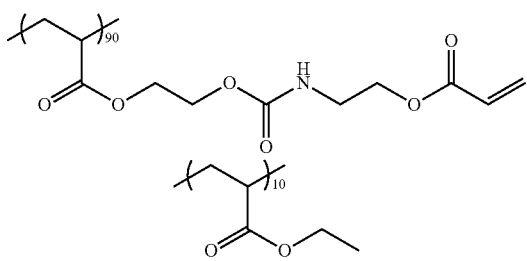

Formation of Optically Anisotropic Layer (1b)

The optically anisotropic layer (2a) prepared above was continuously subjected to a rubbing treatment. At this time, the longitudinal direction and the transport direction of the elongated film were parallel, and the angle formed by the film longitudinal direction (transport direction) and the rubbing roller rotation axis was 76°. In a case where the film longitudinal direction (transport direction) is 90° and the clockwise direction is represented by a positive value with reference to a film width direction (0°) upon observation from the film side, the rotation axis of the rubbing roller is at −14°. In other words, the position of the rotation axis of the rubbing roller is a position rotated by 76° clockwise with reference to the longitudinal direction of the film.

The composition (1b) for forming an optically anisotropic layer was applied onto the optically anisotropic layer (2a) subjected to a rubbing treatment using a Geeser coating machine to form a composition layer. Then, the obtained composition layer was heated with hot air at 110° C. for 2 minutes for drying of the solvent and alignment aging of the disk-like liquid crystal compound. Subsequently, the obtained composition layer was irradiated with UV (500 mJ/cm$^2$) at 80° C. to immobilize the alignment of the liquid crystal compound to form an optically anisotropic layer (1b) corresponding to the second optically anisotropic layer.

The thickness of the optically anisotropic layer (1b) was 1.1 μm. The retardation at a wavelength of 550 nm was 168 nm. It was confirmed that the average tilt angle of the disc plane of the disk-like liquid crystal compound with respect to the film surface was 90°, and the disk-like liquid crystal compound was aligned perpendicular to the film surface. In addition, assuming that the angle of the in-plane slow axis of the optically anisotropic layer (1b) is parallel to the rotation axis of the rubbing roller, and the width direction of the film is 0° (the counterclockwise direction is 90° and the clockwise direction is −90° in a longitudinal direction), the in-plane slow axis direction of the optically anisotropic layer (1b) was −14° in a case of viewing from the optically anisotropic layer (1b) side.

A laminate (2a-1b) in which the optically anisotropic layer (2a) and the optically anisotropic layer (1b) were laminated on the cellulose acylate film was prepared by the above procedure. The difference in the refractive index between the average refractive index of the optically anisotropic layer (2a) and the average refractive index of the optically anisotropic layer (1b) was within 0.05.

The surface side of the optically anisotropic layer (1b) of the laminate (2a-1b) formed on the above prepared elongated cellulose acylate film, and the surface side of the optically anisotropic layer (1c) of the laminate (1c-1d) formed on the elongated cellulose acylate film prepared in Example 1 were continuously bonded to each other using an ultraviolet curable adhesive such that the angle formed by the in-plane slow axis of the optically anisotropic layer (1b) and the in-plane slow axis on the surface side of the optically anisotropic layer (1c) is 0°.

An adhesive with high-refractive monomer added to acrylic compound to control the refractive index after curing to 1.58 was used as the ultraviolet curable adhesive. The difference in the refractive index between the average refractive index of the optically anisotropic layer adjacent to the adhesive layer and the average refractive index of the adhesive layer was within 0.05.

Subsequently, the cellulose acylate film on the optically anisotropic layer (2a) side and the alignment film 2 were peeled off to expose the surface of the optically anisotropic layer (2a) in contact with the alignment film 2. In this manner, an optical film (2a-1b-1c-1d) in which the optically anisotropic layer (1d), the optically anisotmpic layer (1c), the optically anisotropic layer (1b), and the optically anisotropic layer (2a) were laminated in this order on an elongated cellulose acylate film was obtained.

Preparation of Circularly Polarizing Plate

The surface of the optically anisotropic layer (2a) of the above prepared elongated optical film (2a-1b-1c-1d) and the surface of the polarizer (the surface opposite to the polarizer protective film) of the elongated linearly polarizing plate prepared in Example 1 were continuously bonded to each other using an ultraviolet curable adhesive having a refractive index controlled to 1.53 after curing. The difference in the refractive index between the average refractive index of the adjacent optically anisotropic layer and the average refractive index of the adhesive layer was 0.08 or less.

Subsequently, the cellulose acylate film on the optically anisotropic layer (1d) side was peeled off to expose the surface of the optically anisotropic layer (1d) in contact with the cellulose acylate film.

In this manner, a circularly polarizing plate (P2) consisting of the optical film (2a-1b-1c-1d) and the linearly polarizing plate was prepared. At this time, the polarizer protective film, the polarizer, the optically anisotropic layer (2a), the optically anisotropic layer (1b), the optically anisotropic layer (1c), and the optically anisotropic layer (1d) were laminated in this order, and the angle formed by the absorption axis of the polarizer and the in-plane slow axis of the optically anisotropic layer (1b) was 76°. The angle formed by the in-plane slow axis of the optically anisotropic layer (1b) and the in-plane slow axis of the optically anisotropic layer (1c) on the surface on the optically anisotropic layer (1b) side was 0°. The twisted angle of the liquid crystal compound of the optically anisotropic layer (1c) was 81°. The angle formed by the absorption axis of the polarizer and the in-plane slow axis of the optically anisotropic layer (1c) on the surface on the optically anisotropic layer (1d) side was 5°.

Example 3

Formation of Optically Anisotropic Layer (3a)

An optically anisotropic layer (3a) having an alignment control ability on the surface and corresponding to the first optically anisotropic layer was formed in the same manner as in Example 1, except that the thickness of the composition layer was changed in the formation of the optically anisotropic layer (1d) of Example 1.

The film thickness of the formed optically anisotropic layer (3a) was 0.4 μm. The in-plane retardation at a wavelength of 550 nm was 0 nm, and the thickness direction retardation at a wavelength of 550 μm was −45 nm. It was confirmed that the average tilt angle of the major axis direction of the rod-like liquid crystal compound with respect to the film surface was 90°, and the rod-like liquid crystal compound was aligned perpendicular to the film surface.

Formation of Optically Anisotropic Layer (3b)

Next, a composition (3b) for forming an optically anisotropic layer containing a rod-like liquid crystal compound having the following composition was applied onto the optically anisotropic layer (3a) prepared above by using a Geeser coating machine, and heated with hot air at 80° C. for 60 seconds. Subsequently, the obtained composition layer was irradiated with UV (500 mJ/cm$^2$) at 80° C. to immobilize the alignment of the liquid crystal compound to form an optically anisotropic layer (3b) corresponding to the second optically anisotropic layer.

The thickness of the optically anisotropic layer (3b) was 1.2 μm. The in-plane retardation at a wavelength of 550 nm was 168 nm. It was confirmed that the average tilt angle of the major axis direction of the rod-like liquid crystal compound with respect to the film surface was 0°, and the rod-like liquid crystal compound was horizontally aligned (homogeneously aligned) with respect to the film surface. In addition, assuming that the width direction of the film is defined as 0° (the counterclockwise direction is defined as 90° and the clockwise direction is defined as −90° in a longitudinal direction), the in-plane slow axis direction of the optically anisotropic layer (3b) was 104° in a case of viewing from the optically anisotropic layer (3b) side.

Composition (3b) for Forming Optically Anisotropic Layer
Rod-like liquid crystal compound (A) given above 100 parts by mass
Ethylene oxide-modified trimethylolpropane triacrylate 4 parts by mass
(V #360, manufactured by Osaka Organic Chemical Industry Ltd.)
Photopolymerization initiator 3 parts by mass
(Irgacure 819, manufactured by BASF SE)
Fluorine-containing compound C given above 0.08 parts by mass
Methyl ethyl ketone 156 parts by mass A laminate (3a-3b) in which the optically anisotropic layer (3a) and the optically anisotropic layer (3b) were directly laminated on an elongated cellulose acylate film was prepared by the above procedure. The difference in the refractive index between the average refractive index of the optically anisotropic layer (3a) and the average refractive index of the optically anisotmpic layer (3b) was within 0.05.

It was confirmed that the photo-alignable polymer was present in a case where the surface of the optically anisotropic layer (3a) on the side in contact with the optically anisotropic layer (3b) was examined by the above-mentioned method.

Formation of Optically Anisotropic Layer (3d)

An optically anisotropic layer (3d) corresponding to the fourth optically anisotropic layer was formed in the same manner as in Example 2, except that the thickness of the composition layer was changed in the formation of the optically anisotropic layer (2a) of Example 2.

The thickness of the optically anisotropic layer (3a) was 0.4 μm. In addition, the in-plane retardation at a wavelength of 550 nm was 0 nm, and the thickness direction retardation at a wavelength of 550 nm was 55 nm. It was confirmed that the average tilt angle of the disc plane of the disk-like liquid crystal compound with respect to the film surface was 0°, and the disk-like liquid crystal compound was horizontally aligned with respect to the film surface.

Formation of Optically Anisotropic Layer (3c)

The optically anisotropic layer (3d) prepared above was continuously subjected to a rubbing treatment. At this time, the longitudinal direction and the transport direction of the elongated film were parallel, and the angle between the film longitudinal direction (transport direction) and the rubbing roller rotation axis was 85°. In a case where the film longitudinal direction (transport direction) is 90° and the clockwise direction is represented by a positive value with reference to a film width direction as a reference (0°) in a case of being observed from the film side, the rotation axis of the rubbing roller is at 5°. In other words, the position of the rotation axis of the rubbing roller is a position rotated by 85° counterclockwise with reference to the longitudinal direction of the film.

The following composition (3c) for forming an optically anisotropic layer was applied onto the optically anisotropic layer (3d) subjected to a rubbing treatment using a Geeser coating machine to form a composition layer. Then, the obtained composition layer was heated with hot air at 110° C. for 2 minutes for drying of the solvent and alignment aging of the disk-like liquid crystal compound. Subsequently, the obtained composition layer was irradiated with UV (500 mJ/cm$^2$) at 80° C. to immobilize the alignment of the liquid crystal compound to form an optically anisotropic layer (3c) corresponding to the third optically anisotropic layer.

The optically anisotropic layer (3c) had a thickness of 1.1 μm, bind of 164 nm at a wavelength of 550 nm, and a twisted angle of a liquid crystal compound of 81°. Assuming that the width direction of the film is defined as 0° (the longitudinal direction of the film is defined as 90°), the in-plane slow axis direction was 76° on the air side and −5° on the side in contact with the optically anisotropic layer (3d) in a case of viewing from the optically anisotropic layer (3c) side.

The in-plane slow axis direction of the optically anisotropic layer is expressed as negative in a case where it is clockwise (right-handed turning) and positive in a case where it is counterclockwise (left-handed turning) with the width direction of the substrate as a reference of 0°, upon observing the circularly polarizing plate from the surface side of the optically anisotropic layer.

Composition (3c) for Forming Optically Anisotropic Layer
Disk-like liquid crystal compound 1 given above 80 parts by mass
Disk-like liquid crystal compound 2 given above 20 parts by mass
Alignment film interface alignment agent 1 given above 0.55 parts by mass
Fluorine-containing compound A given above 0.1 parts by mass
Fluorine-containing compound B given above 0.05 parts by mass
Fluorine-containing compound C given above 0.21 parts by mass
Right-handed twisting chiral agent (L2) given below 0.30 parts by mass
Ethylene oxide-modified trimethylolpropane triacrylate 10 parts by mass
(V #360, manufactured by Osaka Organic Chemical industry Ltd.)
Photopolymerization initiator 3.0 parts by mass
(Irgacure 907, manufactured by BASF SE)
Methyl ethyl ketone 200 parts by mass Right-Handed Twisting Chiral Agent (L2)

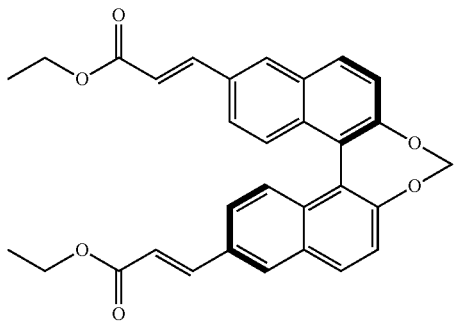

A laminate (3c-3d) in which the optically anisotropic layer (3d) and the optically anisotropic layer (3c) were laminated on a cellulose acylate film was prepared by the above procedure. The difference in the refractive index between the average refractive index of the optically anisotropic layer (3c) and the average refractive index of the optically anisotropic layer (3d) was within 0.05.

The surface side of the optically anisotropic layer (3b) of the laminate (3a-3b) formed on the above prepared elongated cellulose acylate film, and the surface side of the optically anisotropic layer (3c) of the laminate (3c-3d) formed on the above prepared elongated cellulose acylate film were continuously bonded to each other using an ultraviolet curable adhesive such that the angle formed by the in-plane slow axis of the optically anisotropic layer (3b) and the in-plane slow axis on the surface side of the optically anisotropic layer (3c) is 0°.

An adhesive with high-refractive monomer added to acrylic compound to control the refractive index after curing to 1.58 was used as the ultraviolet curable adhesive. The difference in the refractive index between the average refractive index of the optically anisotropic layer adjacent to the adhesive layer and the average refractive index of the adhesive layer was within 0.05.

Subsequently, the cellulose acylate film on the optically anisotropic layer (3a) side was peeled off to expose the surface of the optically anisotropic layer (3a) in contact with the cellulose acylate film. In this manner, an optical film (3a-3b-3c-3d) in which the optically anisotropic layer (3d), the optically anisotropic layer (3c), the optically anisotropic layer (3b), and the optically anisotropic layer (3a) were laminated in this order on an elongated cellulose acylate film was obtained.

Preparation of Circularly Polarizing Plate

The surface of the optically anisotropic layer (3a) of the above prepared elongated optical film (3a-3b-3c-3d) and the surface of the polarizer (the surface opposite to the polarizer protective film) of the elongated linearly polarizing plate prepared in Example 1 were continuously bonded to each other using an ultraviolet curable adhesive having a refractive index controlled to 1.53 after curing. The difference in the refractive index between the average refractive index of the adjacent optically anisotropic layer and the average refractive index of the adhesive layer was 0.08 or less.

Subsequently, the cellulose acylate film on the optically anisotropic layer (3d) side was peeled off to expose the surface of the optically anisotropic layer (3d) in contact with the cellulose acylate film.

In this manner, a circularly polarizing plate (P3) consisting of the optical film (3a-3b-3c-3d) and the linearly polarizing plate was prepared. At this time, the polarizer protective film, the polarizer, the optically anisotropic layer (3a), the optically anisotropic layer (3b), the optically anisotropic layer (3c), and the optically anisotropic layer (3d) were laminated in this order, and the angle formed by the absorption axis of the polarizer and the slow axis of the optically anisotmpic layer (3h) was 14°. The angle formed by the in-plane slow axis of the optically anisotropic layer (3b) and the in-plane slow axis of the optically anisotropic layer (3c) on the surface on the optically anisotropic layer (3b) side was 0°. The twisted angle of the liquid crystal compound of the optically anisotropic layer (3c) was 81°. The angle formed by the absorption axis of the polarizer and the in-plane slow axis of the optically anisotropic layer (3c) on the surface on the optically anisotropic layer (3d) side was 95°.

In the circularly polarizing plate (P3), the in-plane slow axis of the optically anisotropic layer (3b) is rotated counterclockwise by 14°, and the twisted direction of the liquid crystal compound in the optically anisotropic layer (3c) is clockwise, with reference to the absorption axis of the polarizer, upon observing the circularly polarizing plate (P3) from the optically anisotropic layer side.

Whether the twisted direction of the liquid crystal compound is clockwise or counterclockwise is determined with reference to the in-plane slow axis on the surface (the surface on the front side) of the optically anisotropic layer (3c) on the optically anisotropic layer (3d) side, upon observing the circularly polarizing plate (P3) from the optically anisotropic layer side.

Example 4

Formation of Optically Anisotropic Layer (4a)

A composition (4a) for forming an optically anisotropic layer containing a disk-like liquid crystal compound having the following composition was applied onto a cellulose triacetate film TG40 (manufactured by FUJIFILM Corporation, thickness: 40 μm) using a Geeser coating machine to form a composition layer. After that, both ends of the film were held, a cooling plate (9° C.) was installed on the side of the surface on which the coating film of the film was formed so that the distance from the film was 5 mm, and a heater (110° C.) was installed on the side opposite to the surface on which the coating film of the film was formed so that the distance from the film was 5 mm, followed by drying for 90 seconds.

Next, the obtained film was heated with hot air at 116° C. for 1 minute, and irradiated with ultraviolet rays having an irradiation amount of 150 mJ/cm$^2$ using a 365 nm UV-LED while purging with nitrogen so as to have an atmosphere having an oxygen concentration of 100 ppm by volume or less. Then, the obtained coating film was annealed with hot air at 115° C. for 25 seconds to form an optically anisotropic layer (4a) corresponding to the first optically anisotropic layer.

The obtained optically anisotropic layer (4a) was irradiated with UV light (ultra-high pressure mercury lamp; UL750, manufactured by HOYA Corporation) passing through a wire grid polarizer at room temperature at 7.9 mJ/cm$^2$ (wavelength: 313 nm) to impart an alignment control ability to the surface.

The film thickness of the formed optically anisotropic layer (4a) was 1.0 μm. The in-plane retardation Re at a wavelength of 550 nm was 0 nm, and the thickness direction retardation Rth at a wavelength of 550 nm was 40 nm. It was confirmed that the average tilt angle of the disc plane of the disk-like liquid crystal compound with respect to the film surface was 0°, and the disk-like liquid crystal compound was horizontally aligned with respect to the film surface.

Composition (4a) for Forming Optically Anisotropic Layer

Disk-like liquid crystal compound 1 given above 8 parts by mass

Disk-like liquid crystal compound 2 given above 2 parts by mass

Disk-like liquid crystal compound 3 given below 95.6 parts by mass

Polymerizable monomer 1 given below 14.0 parts by mass

Polymerization initiator S-1 (oxime type) given above 3.0 parts by mass

Photoacid generator D-1 given above 3.0 parts by mass

Photo-alignable polymer A-2 given below 1.0 part by mass

Triisopropylamine 0.2 parts by mass o-xylene 634 parts by mass

Disk-Like Liquid Crystal Compound 3

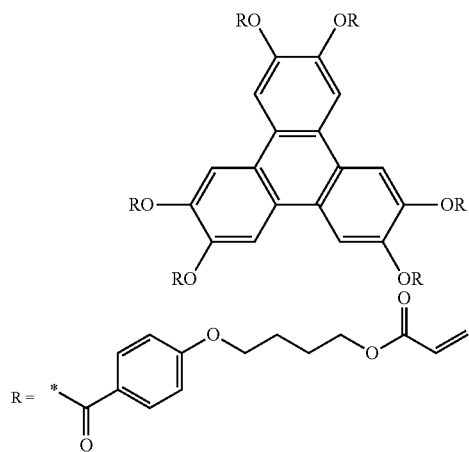

Polymerizable Monomer 1

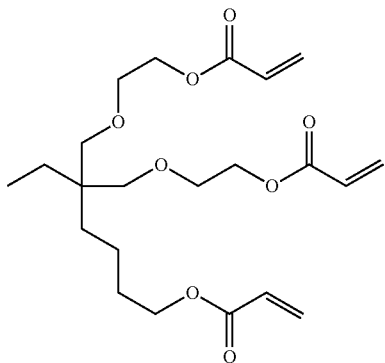 [SMILES: C=CC(=O)OCCCCC(CC)(COCCOC(=O)C=C)COCCOC(=O)C=C]

Photo-alignable polymer A-2 (The alphabet in each repeating unit represents the content (% by mass) of each repeating unit with respect to all the repeating units, which was 37% by mass, 37% by mass, and 26% by mass from the left repeating unit. In addition, the weight-average molecular weight was 73,000.)

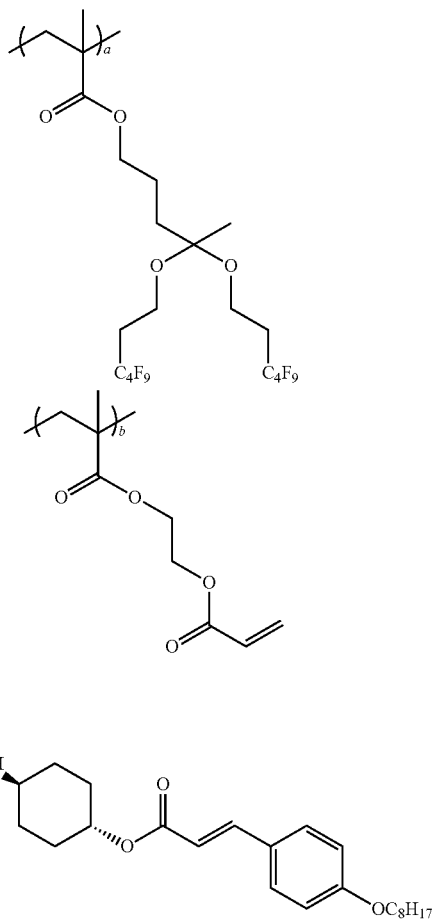

Formation of Optically Anisotropic Layer (4b)

Next, a composition (4b) for forming an optically anisotropic layer containing a disk-like liquid crystal compound having the following composition was applied onto the optically anisotropic layer (4a) prepared above by using a Geeser coating machine, and heated with hot air at 95° C. for 120 seconds. Subsequently, the obtained composition layer was irradiated with UV (100 mJ/cm$^2$) at 95° C. to immobilize the alignment of the liquid crystal compound to form an optically anisotropic layer (4b) corresponding to the second optically anisotropic layer.

The optically anisotropic layer (4b) had a thickness of 1.5 μm and Δnd of 153 nm at a wavelength of 550 nm. It was confirmed that the average tilt angle of the disc plane of the disk-like liquid crystal compound with respect to the film surface was 90°, and the disk-like liquid crystal compound was aligned perpendicular to the film surface.

In addition, assuming that the angle of the in-plane slow axis of the optically anisotropic layer (4b) is parallel to the rotation axis of the rubbing roller, and the width direction of the film is 0° (the counterclockwise direction is 90° and the clockwise direction is −90° in a longitudinal direction), the in-plane slow axis direction of the optically anisotropic layer (4b) was −14° in a case of viewing from the optically anisotropic layer (4b) side.

Composition (4b) for Forming Optically Anisotropic Layer

Disk-like liquid crystal compound 1 given above 80 parts by mass

Disk-like liquid crystal compound 2 given above 20 parts by mass

Alignment film interface alignment agent 1 given above 1.8 parts by mass
Polymerizable monomer 1 given above 10.0 parts by mass
Polymerization initiator S-1 (oxime type) given above 5.0 parts by mass
Fluorine-containing compound A given above 0.1 parts by mass
Fluorine-containing compound D given below 0.2 parts by mass
Fluorine-containing compound E given below 0.1 parts by mass
Anti-foaming agent 1 given below 2.1 parts by mass
Methyl ethyl ketone 419 parts by mass Fluorine-containing compound D (The numerical value in each repeating unit represents the content (% by mass) with respect to all the repeating units, the content of the repeating unit on the left side is 52% by mass, and the content of the repeating unit on the right side is 48% by mass.)

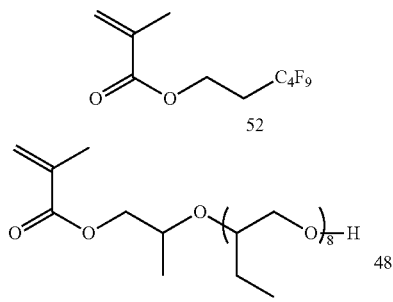

Fluorine-containing compound E (The content of the repeating unit on the left side was 36% by mass, and the content of the repeating unit on the right side was 64% by mass).

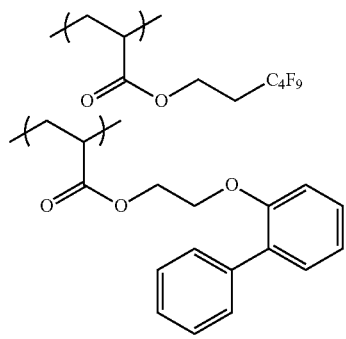

Anti-Foaming Agent 1

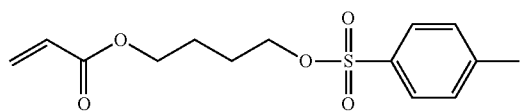 [SMILES: C=CC(=O)OCCCCOS(=O)(=O)c1ccc(C)cc1]

A laminate (4a-4b) in which the optically anisotropic layer (4a) and the optically anisotropic layer (4b) were directly laminated on the cellulose acylate film TG40 was prepared by the above procedure.

The difference between the average refractive index of the optically anisotropic layer (4a) and the average refractive index of the optically anisotropic layer (4b) was 0.05 or less.

Formation of Optically Anisotropic Layer (4d)

An optically anisotropic layer (4d) corresponding to the fourth optically anisotropic layer was formed in the same manner as in Example 1, except that the thickness of the composition layer was changed in the formation of the optically anisotropic layer (1 d) of Example 1.

The film thickness of the formed optically anisotropic layer (4d) was 0.7 μm. The in-plane retardation Re at a wavelength of 550 nm was 0 nm, and the thickness direction retardation Rth at a wavelength of 550 nm was −85 nm. It was confirmed that the average tilt angle of the major axis direction of the rod-like liquid crystal compound with respect to the film surface was 90°, and the rod-like liquid crystal compound was aligned perpendicular to the film surface.

Formation of Optically Anisotropic Layer (4c)

Next, an optically anisotropic layer (4c) corresponding to the third optically anisotropic layer was formed on the above prepared optically anisotropic layer (4d) in the same manner as in Example 1, except that the thickness of the composition layer was changed in the formation of the optically anisotropic layer (1c) of Example 1.

The optically anisotropic layer (4c) had a thickness of 1.25 μm, Δnd of 170 nm at a wavelength of 550 nm, and a twisted angle of a liquid crystal compound of 85°. Assuming that the width direction of the film is defined as 0° (the longitudinal direction of the film is defined as 90°), the in-plane slow axis direction (alignment axis angle of the liquid crystal compound) was 10° on the air side and 95° on the side in contact with the optically anisotropic layer (4d), in a case of viewing from the optically anisotropic layer (4c) side.

The in-plane slow axis direction of the optically anisotropic layer is expressed as negative in a case where it is clockwise (right-handed turning) and positive in a case where it is counterclockwise (left-handed turning) with the width direction of the substrate as a reference of 0°, upon observing the substrate from the surface side of the optically anisotropic layer.

A laminate (4c-4d) in which the optically anisotropic layer (4d) and the optically anisotropic layer (4c) were directly laminated on an elongated cellulose acylate film was prepared by the above procedure. The difference in the refractive index between the average refractive index of the optically anisotropic layer (4c) and the average refractive index of the optically anisotropic layer (4d) was within 0.05.

The surface side of the optically anisotropic layer (4b) of the laminate (4a-4b) formed on the above prepared cellulose acylate film TG40, and the surface side of the optically anisotropic layer (4c) of the laminate (4c-4d) formed on the above prepared elongated cellulose acylate film were continuously bonded to each other using an ultraviolet curable adhesive such that the in-plane slow axis on the surface side of the optically anisotropic layer (4b) of the laminate (4a-4b) with respect to the in-plane slow axis on the surface side of the optically anisotropic layer (4c) of the laminate (4c-4d) is +4°.

The in-plane slow axis direction of the optically anisotropic layer is expressed as negative in a case where it is clockwise (right-handed turning) and positive in a case where it is counterclockwise (left-handed turning) with the width direction of the substrate as a reference of 0°, upon observing the laminate from the surface side of the optically anisotropic layer (4a).

An adhesive with high-refractive monomer added to acrylic compound to control the refractive index after curing to 1.58 was used as the ultraviolet curable adhesive. The difference in the refractive index between the average refractive index of the optically anisotropic layer adjacent to the adhesive layer and the average refractive index of the adhesive layer was within 0.05.

Subsequently, the cellulose acylate film on the optically anisotropic layer (4a) side and the optically anisotropic layer (4a) were peeled off to expose the surface of the optically anisotropic layer (4a) in contact with the cellulose acylate film. In this manner, an optical film (4a-4b-4c-4d) in which the optically anisotropic layer (4d), the optically anisotropic layer (4c), the optically anisotropic layer (4b), and the optically anisotropic layer (4a) were laminated in this order on an elongated cellulose acylate film was obtained.

Preparation of Circularly Polarizing Plate

The surface of the optically anisotropic layer (4a) of the above prepared elongated optical film (4a-4b-4c-4d) and the surface of the polarizer (the surface opposite to the polarizer protective film) of the elongated linearly polarizing plate prepared in Example 1 were continuously bonded to each other using an ultraviolet curable adhesive having a refractive index controlled to 1.53 after curing in the same manner as described above. The difference in the refractive index between the average refractive index of the adjacent optically anisotropic layer and the average refractive index of the adhesive layer was 0.08 or less.

Subsequently, the cellulose acylate film on the optically anisotropic layer (4d) side was peeled off to expose the surface of the optically anisotropic layer (4d) in contact with the cellulose acylate film.

In this manner, a circularly polarizing plate (P4) consisting of the optical film (4a-4b-4c-4d) and the linearly polarizing plate was prepared. At this time, the polarizer protective film, the polarizer, the optically anisotropic layer (4a), the optically anisotropic layer (4b), the optically anisotropic layer (4c), and the optically anisotropic layer (4d) were laminated in this order, and the angle formed by the absorption axis of the polarizer and the in-plane slow axis of the optically anisotropic layer (4b) was 76°. The angle formed by the in-plane slow axis of the optically anisotropic layer (4b) and the in-plane slow axis of the optically anisotropic layer (4c) on the surface on the optically anisotropic layer (4b) side was 4°. The twisted angle of the liquid crystal compound of the optically anisotropic layer (4c) was 85°. The angle formed by the absorption axis of the polarizer and the in-plane slow axis of the optically anisotropic layer (4c) on the surface on the optically anisotropic layer (4d) side was 5°.

Example 5

The optically anisotropic layer (1b), the optically anisotropic layer (1c), the optically anisotropic layer (1d), and the circularly polarizing plate were prepared in the same manner as in Example 1, except that the optically anisotropic layer (1a) consisting of a cellulose acylate film corresponding to the first optically anisotropic layer of Example 1 was replaced with cellulose acetate TJ25 (manufactured by FUJIFILM Corporation, thickness: 25 μm) (optically anisotropic layer (5a)).

Example 6

The optically anisotropic layer (1b), the optically anisotropic layer (1c), the optically anisotropic layer (1d), and the circularly polarizing plate were prepared in the same manner as in Example 1, except that the optically anisotropic layer (1a) consisting of a cellulose acylate film corresponding to the first optically anisotropic layer of Example 1 was replaced with the following optically anisotropic layer (6a).

Preparation of Cellulose Acylate Film

The following composition was put into a mixing tank, stirred, and further heated at 90° C. for 10 minutes. Then, the obtained composition was filtered through a filter paper having an average pore diameter of 34 μm and a sintered metal filter having an average pore diameter of 10 μm to prepare a dope. The concentration of solid contents of the dope is 19.0% by mass, and the solvent of the dope is methylene chloride/methanol=87/13 (mass ratio).

Cellulose Acylate Dope
Cellulose acylate (acetyl substitution degree: 2.88) 100.0 parts by mass
Ester oligomer 10.0 parts by mass
(dicarboxylic acid: adipic acid/phthalic acid=3/7, ethylene glycol, acetyl group terminal, molecular weight: 1,000)
Polarizer durability improving agent 4.0 parts by mass
(compound having the following structural formula)
Ultraviolet absorber 2.0 parts by mass
(compound having the following structural formula)
Retardation enhancer 3.0 parts by mass
(compound having the following structural formula)
Solvent (methylene chloride/methanol)

Polarizer Durability Improving Agent

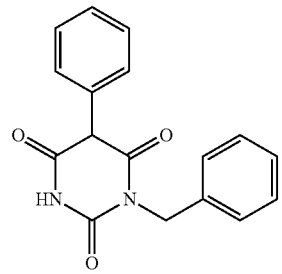 [SMILES: O=C1NC(=O)N(Cc2ccccc2)C(=O)C1c1ccccc1]

Ultraviolet Absorber

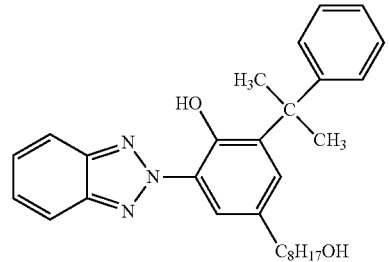

Retardation Enhancer

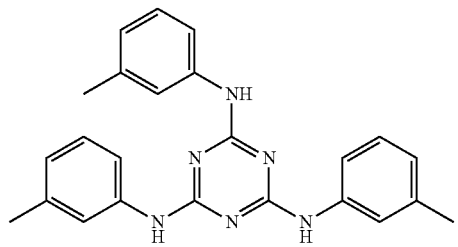

The dope prepared above was cast using a band film forming machine. The dope was cast from a die such that it was in contact with a metal support set to 20° C., and then the obtained web (film) was stripped off. The band was made of SUS.

The web (film) obtained by casting was peeled off from the band in a state where the solvent content was about 20% by mass, and then the film was dried in a state where the residual solvent was 3% to 15% while being stretched 1.1 times in a lateral direction, upon transporting the film. Then, the film was transported between rolls of a heat treatment apparatus to be further dried to prepare a cellulose acylate film having a thickness of 25 μm.

The obtained cellulose acylate film had an in-plane retardation of 1 nm at a wavelength of 550 nm, and a thickness direction retardation of 30 nm at a wavelength of 550 nm.

Example 7

The optically anisotropic layer (6a) consisting of a cellulose acylate film corresponding to the first optically anisotropic layer, the optically anisotropic layer (1b), the optically anisotropic layer (1c), the optically anisotropic layer (1d), and the circularly polarizing plate were prepared using the following pressure sensitive adhesive A in place of the ultraviolet curable adhesive used in Example 6.

The surface side of the optically anisotropic layer (1b) of the laminate (6a-1b) formed on the elongated cellulose acylate film prepared in Example 6, and the surface side of the optically anisotropic layer (1c) of the laminate (1c-1d) prepared in Example 1 and formed on an elongated cellulose acylate film were continuously bonded to each other using a pressure sensitive adhesive A such that the angle formed by the in-plane slow axis of the optically anisotropic layer (1b) and the in-plane slow axis on the surface side of the optically anisotropic layer (1c) is 0°.

The refractive index of the pressure sensitive adhesive A was controlled to 1.54, and a pressure sensitive adhesive layer having a thickness of 15 μm was formed. The difference between the refractive index averaged in the axis direction of the adjacent optically anisotropic layer and the refractive index of the pressure sensitive adhesive was within 0.08.

Subsequently, the cellulose acylate film on the optically anisotropic layer (1d) side was peeled off to expose the surface of the optically anisotropic layer (1d) in contact with the cellulose acylate film. In this manner, an optical film (6a-1b-1c-1d) in which the optically anisotropic layer (1b), the optically anisotropic layer (1c), and the optically anisotropic layer (1d) were laminated in this order on the optically anisotropic layer (6a) consisting of an elongated cellulose acylate film was obtained.

Preparation of Circularly Polarizing Plate

The surface of the optically anisotropic layer (6a) of the above prepared elongated optical film (6a-1b-1c-1d) and the surface of the polarizer (the surface opposite to the polarizer protective film) of the above prepared elongated linearly polarizing plate were continuously bonded to each other using the above PVA adhesive.

In this manner, a circularly polarizing plate (P7) consisting of the optical film (6a-1b-1c-1d) and the linearly polarizing plate was prepared. At this time, the polarizer protective film, the polarizer, the optically anisotropic layer (6a), the optically anisotropic layer (1b), the optically anisotropic layer (1c), and the optically anisotropic layer (1d) were laminated in this order, and the angle formed by the absorption axis of the polarizer and the in-plane slow axis of the optically anisotropic layer (1b) was 76°. In addition, the angle formed by the in-plane slow axis of the optically anisotropic layer (1b) and the in-plane slow axis of the optically anisotropic layer (1c) on the surface on the optically anisotropic layer (1b) side was 0°. The twisted angle of the liquid crystal compound of the optically anisotropic layer (1c) was 81°. The angle formed by the absorption axis of the polarizer and the in-plane slow axis of the optically anisotropic layer (1c) on the surface on the optically anisotropic layer (1d) side was 5°.

Example 8

The optically anisotropic layer (6a) consisting of a cellulose acylate film corresponding to the first optically anisotropic layer, the optically anisotropic layer (1b), the optically anisotropic layer (1c), the optically anisotropic layer (1d), and the circularly polarizing plate were prepared using the following pressure sensitive adhesive B in place of the ultraviolet curable adhesive used in Example 6.

The surface side of the optically anisotropic layer (1b) of the laminate (6a-1b) formed on the elongated cellulose acylate film prepared in Example 6, and the surface side of the optically anisotropic layer (1c) of the laminate (1c-1d) formed on the elongated cellulose acylate film prepared in Example 1 were continuously bonded to each other using a pressure sensitive adhesive B such that the angle formed by the in-plane slow axis of the optically anisotropic layer (1b) and the in-plane slow axis on the surface side of the optically anisotropic layer (1c) is 0°.

The pressure sensitive adhesive B contains W-2 described in WO2021/006097A as an ultraviolet absorber and has a refractive index controlled to 1.54, which resulted in the formation of a pressure sensitive adhesive layer having a thickness of 25 μm. The difference between the refractive index averaged in the axis direction of the adjacent optically anisotropic layer and the refractive index of the pressure sensitive adhesive was within 0.08.

Subsequently, the cellulose acylate film on the optically anisotropic layer (1d) side was peeled off to expose the surface of the optically anisotropic layer (1d) in contact with the cellulose acylate film. In this manner, an optical film (6a-1b-1c-1d) in which the optically anisotropic layer (1b), the optically anisotropic layer (1c), and the optically anisotropic layer (1d) were laminated in this order on the optically anisotmpic layer (6a) consisting of an elongated cellulose acylate film was obtained.

Preparation of Circularly Polarizing Plate

The surface of the optically anisotropic layer (6a) of the above prepared elongated optical film (6a-1b-1c-1d) and the surface of the polarizer (the surface opposite to the polarizer protective film) of the above prepared elongated linearly polarizing plate were continuously bonded to each other using the above PVA adhesive.

In this manner, a circularly polarizing plate (P7) consisting of the optical film (6a-1b-1c-1d) and the linearly polarizing plate was prepared. At this time, the polarizer protective film, the polarizer, the optically anisotropic layer (6a), the optically anisotropic layer (1b), the optically anisotropic layer (1c), and the optically anisotropic layer (1d) were laminated in this order, and the angle formed by the absorption axis of the polarizer and the in-plane slow axis of the optically anisotropic layer (1b) was 76°. In addition, the angle formed by the in-plane slow axis of the optically anisotropic layer (1b) and the in-plane slow axis of the optically anisotropic layer (1c) on the surface on the optically anisotropic layer (1b) side was 0°. The twisted angle of the liquid crystal compound of the optically anisotropic layer (1c) was 81°. The angle formed by the absorption axis of the polarizer and the in-plane slow axis of the optically anisotropic layer (1c) on the surface on the optically anisotropic layer (1 d) side was 5°. In addition, the light transmittance of the circularly polarizing plate (P7) at 380 mu was 1% or less. The light transmittance was measured with a spectrophotometer UV-3150 (manufactured by Shimadzu Corporation).

Comparative Example 1

An optical film in which an optically anisotropic layer (h1) consisting of a vertically aligned disk-like liquid crystal compound and an optically anisotropic layer (h2) consisting of a twist-aligned disk-like liquid crystal compound were directly laminated in this order on an elongated cellulose acylate film was prepared in the same manner as in the method described in Example 1 of JP5960743B.

At this time, the in-plane retardation of the optically anisotropic layer (h1) at a wavelength of 550 mu was 181 nm, and assuming that the width direction of the film is defined as 0° (the longitudinal direction of the film is defined as 90°), the in-plane slow axis direction was −13° in a case of viewing from the optically anisotropic layer (h1) side. In addition, Δnd of the optically anisotropic layer (h2) at a wavelength of 550 nm was 172 nm, the twisted angle of the liquid crystal compound was 81°, and assuming that the width direction of the film is defined as 0° (the longitudinal direction of the film is defined as 90°), the in-plane slow axis direction was −94° on the air side and −13° on the side in contact with the cellulose acylate film, in a case of viewing from the optically anisotropic layer (h2) side.

The surface of the cellulose acylate film of the laminate (h1-h2) formed on the above prepared elongated cellulose acylate film, and the surface of the polarizer (the surface opposite to the polarizer protective film) of the above prepared elongated linearly polarizing plate were continuously bonded to each other using an ultraviolet curable adhesive. In this manner, a circularly polarizing plate (PH) was prepared.

Preparation of Organic EL Display Device
Mounting on Display Device

The SAMSUNG GALAXY S4 equipped with an organic EL panel was disassembled, a circularly polarizing plate was peeled off, and each of the circularly polarizing plates prepared in the foregoing Examples 1 to 6 and Comparative Example 1 was bonded to the display device using a pressure sensitive adhesive such that the polarizer protective film was arranged on the outside.

Measurement of Refractive Index

A sample in which each optically anisotropic layer used in each Example and Comparative Example was transferred onto glass using a pressure sensitive adhesive was prepared, the reflectance spectrum of the optically anisotropic layer was measured using a reflection spectroscopic film thickness meter FE3000 (manufactured by Otsuka Electronics Co., Ltd.), and the average refractive index was calculated from the obtained reflectance spectrum. In a case of calculating the average refractive index, the average refractive index n at a wavelength of 550 nm was obtained by fitting the reflectance spectrum to the following Cauchy dispersion equation using the least-square method, under the assumption that the refractive indexes of both interfaces of the optically anisotropic layer are equal. Here, C1, C2, and C3 are parameters of the n-Cauchy model, X is a wavelength, and k is an attenuation coefficient. In addition, the thickness of the sample whose reflectance spectrum was measured was measured using a scanning electron microscope (S-4800, manufactured by Hitachi High-Technologies Corporation), and this measured value was used as the thickness at the time of fitting.

As described above, the average refractive index calculated by the above corresponds to the average refractive index $((nx+ny)/2)$ represented by Expression (N1).

$$n = C_3/\lambda^4 + C_2/\lambda^2 + C_1$$

$k=0$

For the pressure sensitive adhesive layer and the adhesive layer, the average refractive index was measured by the same method as described above.

Evaluation of Display Performance
Front Direction

The prepared organic EL display device was displayed in black and observed from the front under bright light, and the tint shift was evaluated according to the following standards. The results are shown in Table 1 which will be given later.

A: The tint shift is not visible at all, or the tint shift is visible, but only a little. (acceptable)

B: The tint shift is visible, but the reflected light is small and there is no problem in use. (acceptable)

C: The tint shift is visible and there is a lot of reflected light, which is unacceptable.

Oblique Direction

The prepared organic EL display device was displayed in black, a fluorescent lamp is projected from a polar angle of 45° under bright light, and the reflected light was observed from all directions. The azimuthal angle dependence of the tint change was evaluated according to the following standards. The results are shown in Table 1 which will be given later.

A: The tint difference is not visible at all, or the tint difference is visible, but it is very slight. (acceptable)

B: The tint difference is slightly visible, but the tint difference is within the acceptable range, the reflected light is small, and there is no problem in use. (acceptable)

C: The tint difference is visible and there is a lot of reflected light, which is unacceptable.

TABLE 1

| | Optically anisotropic layer laminate | Material | Liquid cystal alignment state | Evaluation of display performance | |
|---|---|---|---|---|---|
| | | | | Front direction | Oblique direction |
| Example 1 | First optically anisotropic layer (1a) | Cellulose acylate | — | A | A |
| | Second optically anisotropic layer (1b) | Disk-like liquid crystal | Vertical | | |
| | Third optically anisotropic layer (1c) | Rod-like liquid crystal | Twisted | | |
| | Fourth optically anisotropic layer (1d) | Rod-like liquid crystal | Vertical | | |

TABLE 1-continued

|  | Optically anisotropic layer laminate | Material | Liquid cystal alignment state | Evaluation of display performance Front direction | Evaluation of display performance Oblique direction |
|---|---|---|---|---|---|
| Example 2 | First optically anisotropic layer (2a) | Disk-like liquid crystal | Horizontal | A | A |
|  | Second optically anisotropic layer (1b) | Disk-like liquid crystal | Vertical |  |  |
|  | Third optically anisotropic layer (1c) | Rod-like liquid crystal | Twisted |  |  |
|  | Fourth optically anisotropic layer (1d) | Rod-like liquid crystal | Vertical |  |  |
| Example 3 | First optically anisotropic layer (3a) | Rod-like liquid crystal | Vertical | A | A |
|  | Second optically anisotropic layer (3b) | Rod-like liquid crystal | Horizontal |  |  |
|  | Third optically anisotropic layer (3c) | Disk-like liquid crystal | Twisted |  |  |
|  | Fourth optically anisotropic layer (3d) | Disk-like liquid crystal | Horizontal |  |  |
| Example 4 | First optically anisotropic layer (4a) | Disk-like liquid crystal | Horizontal | A | A |
|  | Second optically anisotropic layer (4b) | Disk-like liquid crystal | Vertical |  |  |
|  | Third optically anisotropic layer (4c) | Rod-like liquid crystal | Twisted |  |  |
|  | Fourth optically anisotropic layer (4d) | Rod-like liquid crystal | Vertical |  |  |
| Example 5 | First optically anisotropic layer (5a) | Cellulose acylate | — | A | A |
|  | Second optically anisotropic layer (1b) | Disk-like liquid crystal | Vertical |  |  |
|  | Third optically anisotropic layer (1c) | Rod-like liquid crystal | Twisted |  |  |
|  | Fourth optically anisotropic layer (1d) | Rod-like liquid crystal | Vertical |  |  |
| Example 6 | First optically anisotropic layer (6a) | Cellulose acylate | — | A | A |
|  | Second optically anisotropic layer (1b) | Disk-like liquid crystal | Vertical |  |  |
|  | Third optically anisotropic layer (1c) | Rod-like liquid crystal | Twisted |  |  |
|  | Fourth optically anisotropic layer (1d) | Rod-like liquid crystal | Vertical |  |  |
| Comparative Example 1 | (h1) | Disk-like liquid crystal | Vertical | A | C |
|  | (h2) | Disk-like liquid crystal | Twisted |  |  |

From the results shown in Table 1 above, it was confirmed that the phase difference film according to the embodiment of the present invention can suppress a tint shift to black in a front direction and an oblique direction in a case of being used as a circularly polarizing plate in an organic EL display device. On the other hand, the phase difference film of Comparative Example was inferior in suppressing a tint shift to black in an oblique direction in a case of being used as a circularly polarizing plate in an organic EL display device.

Examples 7 and 8 showed the effect of the present invention in the same manner as in Example 6.

EXPLANATION OF REFERENCES

10A, 10B, 10C, 10D: phase difference film
12A, 12B, 12C, 12D: first optically anisotropic layer
14A, 14B, 14C, 14D: second optically anisotropic layer
16A, 16B, 16C, 16D: third optically anisotropic layer
18A, 18B, 18C, 18D: fourth optically anisotropic layer
20: polarizer
22: adhesion layer
100A, 100B: circularly polarizing plate

What is claimed is:

1. A phase difference film comprising:
a first optically anisotropic layer;
a second optically anisotropic layer;
a third optically anisotmpic layer; and
a fourth optically anisotropic layer in this order,
wherein the first optically anisotropic layer is a C-plate,
the second optically anisotropic layer is an A-plate,
the third optically anisotropic layer is a layer formed by fixing a liquid crystal compound twist-aligned along a helical axis extending in a thickness direction,
the fourth optically anisotropic layer is a C-plate,
in a case where the first optically anisotropic layer is a negative C-plate, the second optically anisotropic layer is a negative A-plate, the liquid crystal compound of the third optically anisotropic layer is a rod-like liquid crystal compound, and the fourth optically anisotropic layer is a positive C-plate,
in a case where the first optically anisotropic layer is a positive C-plate, the second optically anisotropic layer is a positive A-plate, the liquid crystal compound of the third optically anisotropic layer is a disk-like liquid crystal compound, and the fourth optically anisotropic layer is a negative C-plate, and an angle formed by an in-plane slow axis of the second optically anisotropic layer and an in-plane slow axis of the third optically anisotropic layer on a surface on the second optically anisotropic layer side is in a range of 0° to 30°.

2. The phase difference film according to claim 1, wherein a twisted angle of the liquid crystal compound is within a range of 80°±30°.

3. The phase difference film according to claim 1, wherein an absolute value of a thickness direction retardation of the first optically anisotropic layer at a wavelength of 550 nm is 5 to 100 nm.

4. The phase difference film according to claim 1, wherein an in-plane retardation of the second optically anisotropic layer at a wavelength of 550 nm is 120 to 240 nm.

5. The phase difference film according to claim 1, wherein a value of a product Δnd of a refractive index anisotropy Δn of the third optically anisotropic layer at a wavelength of 550 nm and a thickness d of the third optically anisotropic layer is 120 to 240 nm.

6. The phase difference film according to claim 1, wherein an absolute value of a thickness direction retardation of the fourth optically anisotropic layer at a wavelength of 550 nm is 5 to 100 nm.

7. A circularly polarizing plate comprising:
a polarizer; and
the phase difference film according to claim 1.

8. A display device comprising the phase difference film according to claim 1.

9. A phase difference film comprising:
a first optically anisotropic layer;
a second optically anisotropic layer;
a third optically anisotropic layer; and
a fourth optically anisotropic layer in this order,
wherein the first optically anisotropic layer and the second optically anisotropic layer are in direct contact with each other or are laminated through an adhesion layer,
the second optically anisotropic layer and the third optically anisotropic layer are in direct contact with each other or are laminated through an adhesion layer,
the third optically anisotropic layer and the fourth optically anisotropic layer are in direct contact with each other or are laminated through an adhesion layer, and
the phase difference film satisfies at least one of the following Requirements 1 to 4,
Requirement 1: a difference between an average refractive index of the first optically anisotropic layer and an average refractive index of a layer in contact with a surface of the first optically anisotropic layer on the second optically anisotropic layer side is 0.10 or less,
Requirement 2: at least one of a difference between an average refractive index of the second optically anisotropic layer and an average refractive index of a layer in contact with a surface of the second optically anisotropic layer on the first optically anisotropic layer side, or a difference between an average refractive index of the second optically anisotropic layer and an average refractive index of a layer in contact with a surface of the second optically anisotropic layer on the third optically anisotropic layer side is 0.10 or less,
Requirement 3: at least one of a difference between an average refractive index of the third optically anisotropic layer and an average refractive index of a layer in contact with a surface of the third optically anisotropic layer on the second optically anisotropic layer side, or a difference between an average refractive index of the third optically anisotropic layer and an average refractive index of a layer in contact with a surface of the third optically anisotropic layer on the fourth optically anisotropic layer side is 0.10 or less,
Requirement 4: a difference between an average refractive index of the fourth optically anisotropic layer and an average refractive index of a layer in contact with a surface of the fourth optically anisotropic layer on the third optically anisotropic layer side is 0.10 or less.

10. The phase difference film according to claim 9, wherein the second optically anisotropic layer and the third optically anisotropic layer are laminated through the adhesion layer,
a difference between the average refractive index of the adhesion layer and an average refractive index of the second optically anisotropic layer is 0.08 or less, and
a difference between the average refractive index of the adhesion layer and an average refractive index of the third optically anisotropic layer is 0.08 or less.

11. A circularly polarizing plate comprising:
a polarizer; and
the phase difference film according to claim 9.

12. A display device comprising the phase difference film according to claim 9.

13. A phase difference film comprising:
a first optically anisotropic layer;
a second optically anisotropic layer;
a third optically anisotropic layer; and
a fourth optically anisotropic layer in this order,
wherein the first optically anisotropic layer is a C-plate,
the second optically anisotropic layer is an A-plate,
the third optically anisotropic layer is a layer formed by fixing a liquid crystal compound twist-aligned along a helical axis extending in a thickness direction,
the fourth optically anisotropic layer is a C-plate,
at least one pair of the first optically anisotropic layer and the second optically anisotropic layer, the second optically anisotropic layer and the third optically anisotropic layer, or the third optically anisotropic layer and the fourth optically anisotropic layer are laminated through an adhesion layer, and
a difference between an average refractive index of the adhesion layer and an average refractive index of the optically anisotropic layer adjacent to the adhesion layer is 0.10 or less.

14. The phase difference film according to claim 13, wherein the phase difference film satisfies all of the following Requirements 1 to 4,
Requirement 1: a difference between an average refractive index of the first optically anisotropic layer and an average refractive index of a layer in contact with a surface of the first optically anisotmpic layer on the second optically anisotropic layer side is 0.10 or less,
Requirement 2: at least one of a difference between an average refractive index of the second optically anisotropic layer and an average refractive index of a layer in contact with a surface of the second optically anisotropic layer on the first optically anisotropic layer side, or a difference between an average refractive index of the second optically anisotropic layer and an average refractive index of a layer in contact with a surface of the second optically anisotropic layer on the third optically anisotropic layer side is 0.10 or less,
Requirement 3: at least one of a difference between an average refractive index of the third optically anisotropic layer and an average refractive index of a layer in contact with a surface of the third optically anisotropic layer on the second optically anisotropic layer side, or a difference between an average refractive index of the third optically anisotropic layer and an average refractive index of a layer in contact with a surface of the third optically anisotropic layer on the fourth optically anisotropic layer side is 0.10 or less, Requirement 4: a difference between an average refractive index of the fourth optically anisotropic layer and an average refractive index of a layer in contact with a surface of the fourth optically anisotropic layer on the third optically anisotropic layer side is 0.10 or less.

15. The phase difference film according to claim 13, wherein the second optically anisotropic layer and the third optically anisotropic layer are laminated through the adhesion layer, a difference between the average refractive index of the adhesion layer and an average refractive index of the second optically anisotropic layer is 0.08 or less, and a difference between the average refractive index of the adhesion layer and an average refractive index of the third optically anisotropic layer is 0.08 or less.

16. A circularly polarizing plate comprising:

a polarizer; and the phase difference film according to claim 13.

17. A display device comprising the phase difference film according to claim 13.

* * * * *